United States Patent
Liu et al.

(10) Patent No.: US 7,483,891 B2
(45) Date of Patent: Jan. 27, 2009

(54) CONTENT PRESENTATION AND MANAGEMENT SYSTEM ASSOCIATING BASE CONTENT AND RELEVANT ADDITIONAL CONTENT

(75) Inventors: Hongche Liu, Fremont, CA (US);
Anand Madhavan, Milpitas, CA (US);
Majid Mohazzab, Saratoga, CA (US);
Hongfeng Yin, Cupertino, CA (US);
Eric Leu, San Jose, CA (US)

(73) Assignee: Yahoo, Inc., Sunnyvale, CA (US)

( * ) Notice: Subject to any disclaimer, the term of this patent is extended or adjusted under 35 U.S.C. 154(b) by 1 day.

(21) Appl. No.: 10/829,814

(22) Filed: Apr. 21, 2004

(65) Prior Publication Data

US 2005/0154746 A1    Jul. 14, 2005

Related U.S. Application Data

(60) Provisional application No. 60/535,265, filed on Jan. 9, 2004.

(51) Int. Cl.
*G06F 17/30* (2006.01)

(52) U.S. Cl. .................. 707/5; 707/6; 707/7

(58) Field of Classification Search ........... 707/1–7, 707/9, 10, 100–102, 104.1; 704/1, 9; 706/11, 706/45, 46, 50; 715/500, 501.1, 513, 514, 715/530–532; 705/1, 35, 37
See application file for complete search history.

(56) References Cited

U.S. PATENT DOCUMENTS

| | | | |
|---|---|---|---|
| 6,102,969 A | | 8/2000 | Christianson et al. |
| 6,131,092 A * | | 10/2000 | Masand ................ 707/6 |
| 6,269,361 B1 * | | 7/2001 | Davis et al. ............. 707/3 |
| 6,502,102 B1 * | | 12/2002 | Haswell et al. ........ 707/102 |
| 6,564,209 B1 * | | 5/2003 | Dempski et al. ........ 707/3 |
| 6,582,474 B2 * | | 6/2003 | LaMarca et al. ........ 707/1 |
| 2002/0040359 A1 * | | 4/2002 | Green et al. |
| 2002/0169760 A1 * | | 11/2002 | Cheung et al. ......... 707/3 |
| 2003/0069803 A1 * | | 4/2003 | Pollitt ................. 705/26 |
| 2003/0069880 A1 * | | 4/2003 | Harrison et al. ....... 707/3 |
| 2003/0101126 A1 * | | 5/2003 | Cheung et al. ......... 705/37 |
| 2003/0172075 A1 | | 9/2003 | Reisman |
| 2004/0093327 A1 * | | 5/2004 | Anderson et al. |

(Continued)

FOREIGN PATENT DOCUMENTS

WO    WO02/10984 A2 *    7/2001

*Primary Examiner*—Debbie M Le
(74) *Attorney, Agent, or Firm*—Brinks Hofer Gilson & Lione

(57) ABSTRACT

A system for determining associations between base content and relevant content and for publishing the base content and relevant content on a client browser. The system includes a parsing module configured to parse the base content to form parsed base content; a unit-dictionary module including a plurality of query units; a unit-extraction module configured to extract query units included in the unit dictionary from the parsed base content, wherein the query units extracted from the base content are referred to as the extracted-query units; a unit-ranking module configured to rank the extracted-query units based on at least one of relevance scores and revenue-generation amounts for the query units; and a unit-matching module configured to generate at least one association between the base content and the relevant content based on whether the extracted-query units and at least one of query units and keywords associated with the relevant content are the same.

47 Claims, 14 Drawing Sheets

U.S. PATENT DOCUMENTS

2004/0243632 A1* 12/2004 Beyer et al. .............. 707/104.1
2005/0027670 A1* 2/2005 Petropoulos ................... 707/1
2005/0065806 A1* 3/2005 Harik ........................... 705/1
2005/0080775 A1* 4/2005 Colledge et al. ............... 707/3

* cited by examiner

| Units | Revenue Generation | Relevancy |
|---|---|---|
| light-duty truck | 0.30 | 0.8 |
| pick-up truck | 0.28 | 0.8 |
| truck | 0.10 | 0.9 |
| car | 0.00 | 0.7 |

Related Unit Dictionary 605

| Real Estate | Car Model | Train |
|---|---|---|
| San Francisco Real Estate | Car Model Dealer | Model Train |
| Los Angeles Real Estate | Car Model Repair Shop | Model Train Collector's Club |
| San Francisco Real Estate Agent | Car Model Owner's Club | Cal Train |
| Los Angeles Real Estate Agent | Car Model Repair Manual | Municipal Train |
| San Francisco Rental Property | Car Model Speed Shop | Light Rail |
| . . . | . . . | Muni Rail |
| | | . . . |

CONTENT PRESENTATION AND MANAGEMENT SYSTEM ASSOCIATING BASE CONTENT AND RELEVANT ADDITIONAL CONTENT

CROSS-REFERENCES TO RELATED APPLICATIONS

This application claims priority to U.S. Provisional Patent Application No. 60/535,265, filed Jan. 9, 2004, of Hongche Liu et al., entitled Content Presentation and Management System Associating Base Content and Relevant Additional Content, and is incorporated by reference herein in its entirety for all purposes.

BACKGROUND OF THE INVENTION

The present invention relates to content management in general and more particularly to methods and apparatus for associating base content with relevant additional content to be presented with the base content.

In a typical content-management system, a user makes a request for base content and receives the base content with additional content that may or may not be relevant to the base content or to the user. The user can be a human user interacting with a user interface of a computer that processes the request for base content and/or forwards the requests to other computer systems. The user could also be another computer process or system that generates the request for base content programmatically. In the latter instance, it is likely that the requesting computer user will also programmatically process the results of the request for base content, but it might instead be the case that a computer user makes a request and a human user is the ultimate recipient of the response.

Base content might include a variety of content provided to a user and presented, for example, on a published web page. For example, base content might include published information, such as articles, about politics, business, sports, movies, weather, finance, health, consumer goods etc. Relevant additional content might include content that is relevant to the base content, a user, a system operator, a content provider, etc. For example, relevant additional content that is relevant to an article about consumer goods might include advertisements for sellers of the consumer goods.

Content-management systems are in common use and many are networked. One common network in use today is referred to as the Internet, a global internetwork of networks, wherein content-management system nodes might use the network to send requests to content-management system nodes elsewhere that might respond with the base content and the additional content. One protocol usable for content-management systems is the Hypertext Transport Protocol (HTTP), wherein an HTTP client, such as a browser, might make a request for base content referenced by a Uniform Resource Locator (URL) and an HTTP server might respond to the requests by sending content specified by the URL. Of course, while this is a very common example, content retrieval is not so limited.

For example, networks other than the Internet might be used, such as a token ring, a WAP (wireless application protocol) network, an overlay network, a point-to-point network, proprietary networks, etc. Protocols other than HTTP might be used to request and transport content, such as SMTP (Simple Mail Transfer Protocol), FTP (File Transfer Protocol), etc., and content might be specified by other than URLs. Portions of the present invention are described with reference to the Internet, a global internetwork of networks in common usage today for a variety of applications, but it should be understood that references to the Internet can be substituted with references to variations of the basic concept of the Internet (e.g., intranets, virtual private networks, enclosed TCP/IP networks, etc.) as well as other forms of networks. It should also be understood that the present invention might operate entirely within one computer or one collection of computers, thus obviating the need for a network.

As briefly described above, the requested base content itself could be in one or more of many forms. For example, some base content might be text, images, video, audio, animation, program code, data structures, formatted text, etc. A user might request base content that is a page having a news story (text) and an accompanying image. The base content may be formatted according to the Hypertext Markup Language (HTML), the Extensible Markup Language (XML), Standard Generalized Markup Language (SGML) or other language in use at the time.

HTML is a common format used for pages or other content that is supplied from an HTTP server. HTML-formatted content might include links to other HTML content and a collection of content that references other content might be thought of as a document web, hence the name "World Wide Web" or "WWW" given to one example of a collection of HTML-formatted content. As that is a well-known construct, it is used in many examples herein, but it should be understood that unless otherwise specified, the concepts described by these examples are not limited to the WWW, HTML, HTTP, the Internet, etc.

A supplier of base content might determine the subject of the base content and/or a user's interests, and provide additional content that is relevant to the base content and or the user's interests. In determining relevant content, the base content provider may maximize a profit, for example, by supplying advertisements that the user may have an interest in, and collecting fees from the advertiser for displaying the advertiser's ads. It is a continuing problem to correctly determine relevant content that is relevant to base content, users, system operators, content providers, etc. Relevant content as referred to herein, might include content that is relevant to base content, users, system operators, content providers, etc.

One approach to providing base content and additional content that is relevant to the base content is to manually create predefined associations between the content and the relevant content, possibly resulting in HTML links in the base content to the additional content. Typically, predetermined associations are manually generated by a person who reads through the base content and additional content to determine relevant associations. Such approach is generally labor intensive and static in nature. For example, a page containing base content H1 would always be presented with its associated relevant content G1. This approach might work well with systems having a small amount of content, but is typically unworkable at larger scales, such as news feeds, wherein the base content could comprise thousands of new news reports per hour.

Another approach to associating base content with additional content that is relevant to the base content is the taxonomy-taxonomy approach, wherein all, or most all, of the base content is assigned a node in a content taxonomy. The additional relevant content is also assigned nodes in a corresponding context taxonomy or the same content taxonomy. Then, when base content is to be presented, the server reads the taxonomy node ID of the base content and then retrieves additional content that has a matching taxonomy node ID or IDs. This approach might work well when base content and additional content are well definable, but this approach does not scale well for large bodies of base content and additional content without much effort.

What is needed is an improved content-management system for base content that automatically associates relevant content with the base content for presentation to a user, such as a human user or a computer user.

BRIEF SUMMARY OF THE INVENTION

A content-management system according to embodiments of the present invention associates base content and additional content that is relevant to the base content. The base content might be served to a user along with the additional content, if a highest-ranking query unit associated with the base content matches a keyword or unit in the additional content. Query units are formed from keywords extracted from the base content and are ranked according to one or both of their relevance scores and revenue-generation amounts. A unit/keyword matching module is configured to compare units and keywords and determine whether to form an association between the base content and additional content so that these contents may be served together to a user. Base content might include a variety of content provided to a user and presented on a published web page. Base content might include text, images, video, audio, animation, program code, data structures, formatted text, etc. Additional content that might be relevant to the base content might includes a similar variety of contents.

According to one embodiment, the content-management system is configured to associate base content with relevant content. The system includes a parsing module configured to parse the base content to form parsed base content; a unit-dictionary module including a plurality of query units; a unit-extraction module configured to extract query units included in the unit dictionary from the parsed base content, wherein the query units extracted from the base content are referred to as the extracted-query units; a unit-ranking module configured to rank the extracted-query units based on at least one of relevance scores and revenue-generation amounts for the query units; and a unit-matching module configured to generate at least one association between the base content and the relevant content based on whether the extracted-query units and at least one of query units and keywords associated with the relevant content are the same. The unit-matching module might be configured to generate the association between the base content and the relevant content based on whether the extracted-query units and at least one of the query units and the keywords associated with the relevant content are the same or are in a same set of related query units and keywords. The relevant content might be pointed at by a set of links that are served with the base content. The set of links might include at least one of a sponsor link, an integrated link, and an inside link. According to a specific embodiment, the system further includes a property server configured to provide a configuration file to the parsing module, and wherein the configuration file includes a set of parsing rules for parsing base content. The configuration file might includes weighting factors for the relevance scores and the revenue-generation amounts, and the parsing rules might provide for parsing at least one of a title, metadata keywords, a metadata description, anchor text, body text, proper nouns, formatted text. According to another specific embodiment, the unit-ranking module is configured to calculate overall-relevance scores for the extracted-query units based on the revenue-generation amounts and the relevance scores. The unit-matching module might be configured to compare an extracted-query unit having a highest overall-relevance score with at least one of the query units and the keywords of the relevant content.

According to another embodiment, a system is provided that is configured to associate base content with relevant content and serve the base content with the relevant content to a user system. The system includes a plurality of property servers configured to provide the base content; a content-management system configured to receive the base content from the property servers and generate associations between the base content and the relevant content, wherein the content-management system includes: a parsing module configured to parse the base content to form parsed base content; a unit-extraction module configured to extract query units from the parsed based content, wherein the units extracted from the base content are referred to as the extracted-query units; a unit-ranking module configured to rank the query units based on at least one of relevance scores and revenue-generation amounts for the query units; and a unit-matching module configured to generate at least one association between the base content and the relevant content based on whether the extracted-query units and at least one of query units or keywords associated with the relevant content are the same; and a client browser configured to receive the base content and the relevant content and present the base content and relevant content as a published web page. The relevant content might include advertisements and might be pointed at by a set of links that are served with the base content. The set of links might include at least one of a sponsor link, an integrated link, and an inside link.

According to another embodiment, a method is provided for serving base content and content that is relevant to the base content, the content being referred to as the relevant content. The method includes parsing the base content to form parsed base content; extracting a set of query units from the parsed base content based on query units in a unit-dictionary module, wherein the query units extracted from the base content are referred to as the extracted-query units; ranking the extracted-query units based on at least one of relevance scores and revenue-generation amounts for the query units extracted from the base content; comparing the extracted-query units with at least one of query units and keywords for the relevant content to determine matches between the extracted-query units and at least one of the query units and the keywords for the relevant content; forming at least one association between the base content and the relevant content if the extracted-query units are the same as at least one of the query units and the keywords for the relevant content; and serving the base content with the relevant content based on the association. According to a specific embodiment, the step of forming the association includes forming the association if the extracted-query units and the query units or the keywords associated the relevant content are the same or are in a same set of related query units and keywords. The relevant content might include includes advertisements and might be pointed at by a set of links that are served with the base content. The set of links might include at least one of a sponsor link, an integrated link, and an inside link. The ranking step might include calculating overall-relevance scores for the extracted-query units based on the revenue-generation amounts and the relevance scores. The overall-relevance scores might be generated according to the formula: $ORS = W*RGA + (1-W)*RS$, wherein ORS is an overall-relevance score, W is a weighting factor, RGA is a revenue-generation amount, and RS is a relevance score.

According to another embodiment, a method is provided for identifying related units related to other units. The method includes receiving a first unit and a second unit; ranking related units in a related-unit dictionary that are associated with the first unit based at least one of revenue-generation amounts of the related units, a search frequency of the related units, and an identifier of a parent category of the first unit; if at least one of the related units includes the second unit, using these related unit for relevant content identification; and if the related units do not include the second unit, using a set of highest ranking related units for relevant content identification. The using steps might include transferring related units to a unit-matching module for relevant content identification. According to a specific embodiment, the method further includes extracting at least one of the first unit and the second unit from a piece of base content prior to transferring these units to the related-unit-identification module.

According to another embodiment a content censor method is provided that includes requesting a piece of base content; classifying the piece of base content as sensitive or non-sensitive; using any unit extracted from the base content to identify relevant content for serving with the base content, if the base content is classified as non-sensitive; using non-offensive units extracted from the base content for identifying relevant content, if the base content is classified as sensitive; using offensive units extracted from the base content for identifying relevant content, if at least one of an advertiser, sponsor, and user agree; serving the base content without relevant content if the keywords are highly offensive. Classifying the base content as sensitive or non-sensitive might include summing scores for offensive units included in the piece of base content, and comparing the sum of the scores against a threshold score. According to a specific embodiment, the method further includes classifying units as offensive units, non-offensive units, or neutral units based on offensiveness scores of categories associated with the units.

Other features and advantages of the invention will be apparent in view of the following detailed description and accompanying figures.

BRIEF DESCRIPTION OF THE DRAWINGS

FIG. 4 is an example chart that includes a number of units and their associated revenue-generation amounts and relevance scores.

FIG. 8 is a table of an example related-unit dictionary that includes a number of units and their associated sets of related units.

DETAILED DESCRIPTION OF THE INVENTION

Embodiments of the invention will now be described, by way of example, not limitation. It is to be understood that the invention is of broad utility and may be used in many different contexts.

Figure 1:
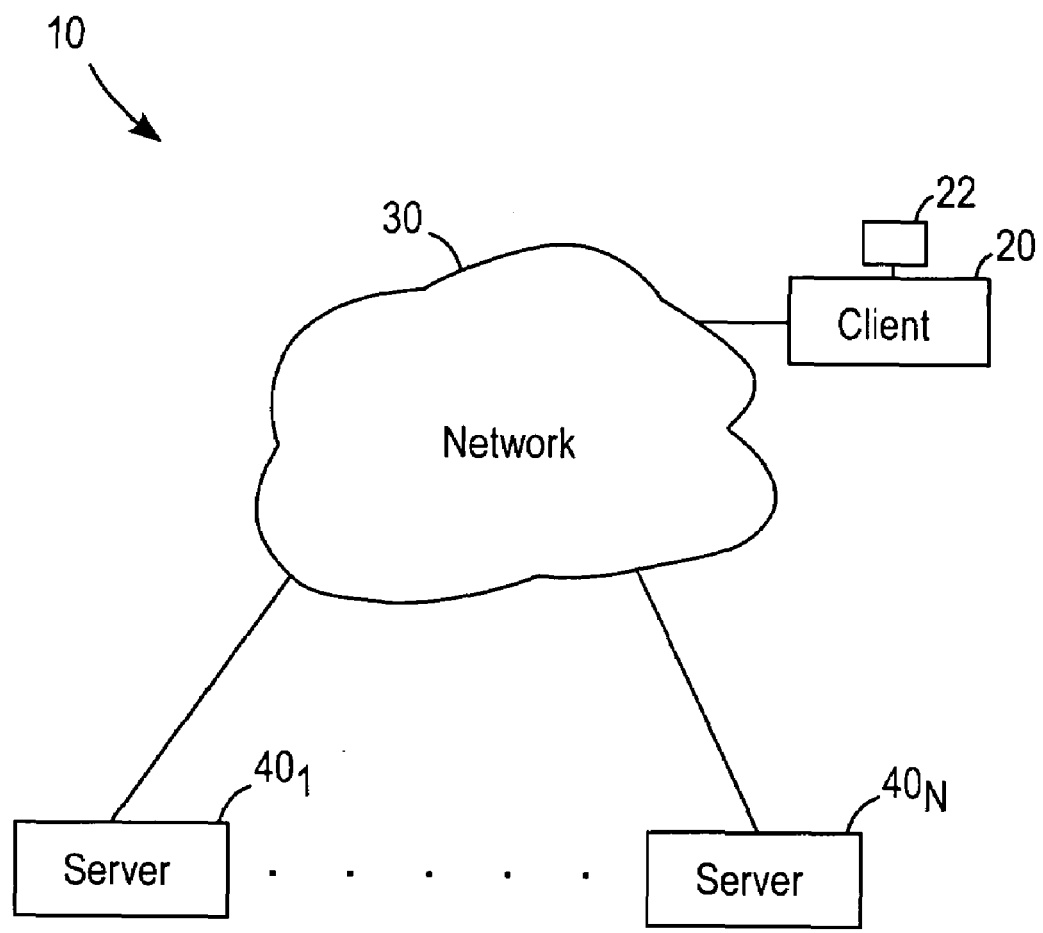
FIG. 1 is a simplified schematic of an information retrieval and communication network including a client system according to an embodiment of the present invention.

FIG. 1 is a simplified schematic of an information retrieval and communication network 10 including a client system 20 according to an embodiment of the present invention. In communication network 10, client system 20 is coupled through a network 30, such as the Internet or an intranet (e.g., a LAN or WAN), to any number of server systems $40_1$ to $40_N$. As will be described herein, client system 20 is configured according to the present invention to communicate with any of server systems $40_1$ to $40_N$, for example, to access, receive, retrieve and display base content and associated relevant content, for example, in the form of a web page. Base content might include text (e.g., articles), images, video, audio, animation, program code, data structures, formatted text, etc. Relevant content might include a similar content variety.

Several elements in the system shown in FIG. 1 include conventional, well-known elements that need not be explained in detail here. For example, client system 20 might include a desktop personal computer, workstation, laptop, PDA, cell phone, any wireless application protocol (WAP) enabled device or any other computing device capable of interfacing directly or indirectly to the Internet. Client system 20 would typically run a browsing program, such as Microsoft's Internet Explorer™ browser, Netscape's Navigator™ browser, Mozilla™ browser, Opera browser, a WAP-enabled browser in the case of a cell phone, PDA or other wireless device, or the like, allowing a user of client system 20 to access, process and view content available to it from server systems $40_1$ to $40_N$ over network 30. Client systems might also use less interactive interfaces, such as computer-to-computer XML interfaces or the like. Client system 20 also typically includes one or more user interface devices 22, such as a keyboard, a mouse, a roller ball, a touch screen, a pen or the like, for interacting with a graphical user interface (GUI) provided by the browser on a display (e.g., monitor screen, LCD display, etc.), in conjunction with pages, forms and other information provided by server systems $40_1$ to $40_N$ or other servers. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and system servers $40_1$-$40_N$ and their respective components are operator configurable using an application including computer code run using one or more central processing units, such as those manufactured by Intel, AMD or the like. Computer code for operating and configuring client system 20 to communicate, process and display base content and content relevant to the base content as described herein is preferably downloaded and stored on a hard disk, but the entire program code, or portions thereof, may also be stored on any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems $40_1$ to $40_N$ to client system 20 over network 30 using a communication medium and protocols (e.g., TCP/IP, HTTP, HTTPS, Ethernet, or other conventional media and protocols). As referred to herein, a server system may include a single server computer or number of server computers.

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 and/or servers $40_1$-$40_N$ or compiled to execute on client system 20 and/or servers $40_1$-$40_N$. In some embodiments, no code is downloaded to client system 20, and needed code is executed by a server, or code already present at client system 20 is executed.

Figure 2:
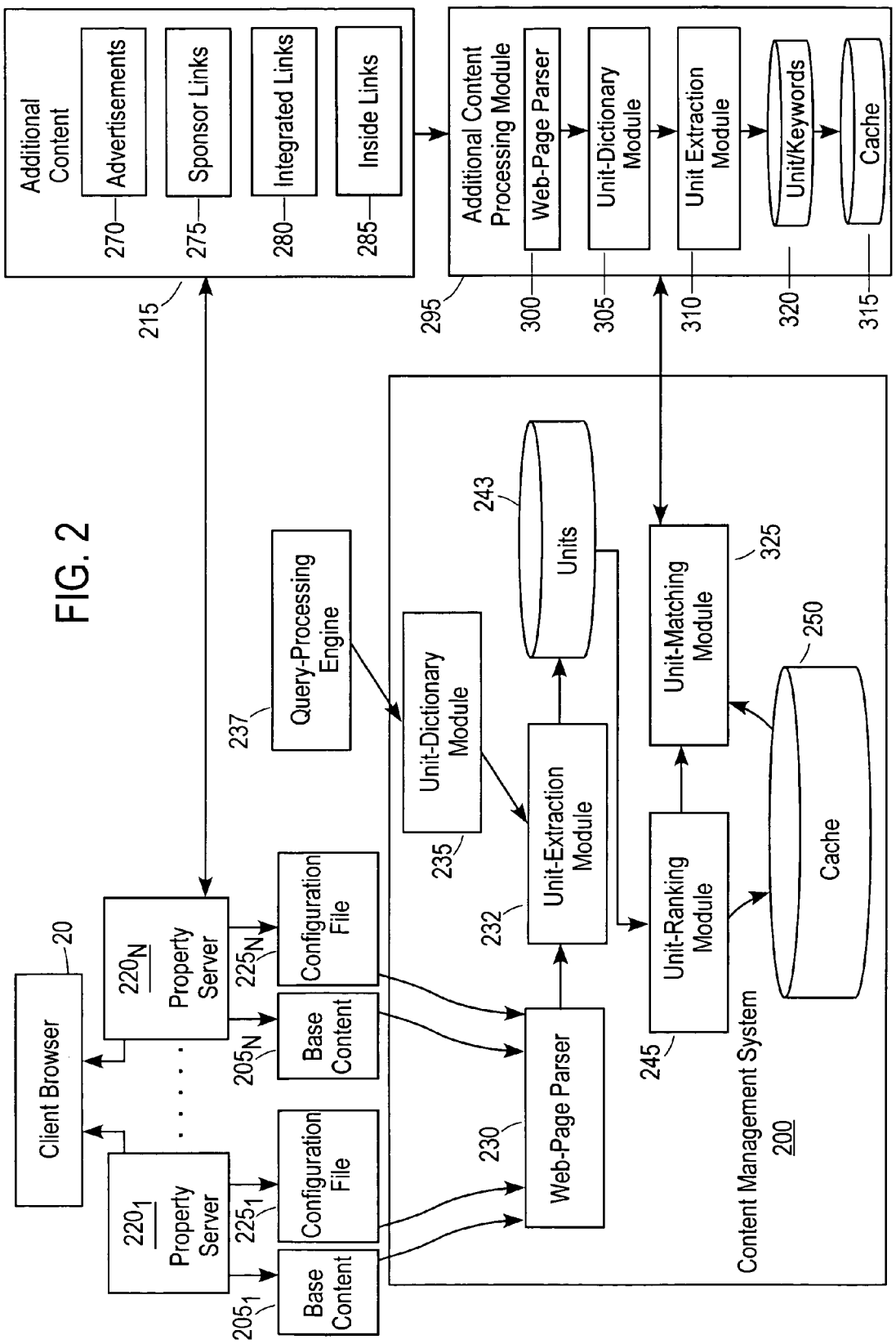
FIG. 2 is a simplified schematic of a content-management system according to an embodiment of the present invention.

FIG. 2 is a simplified schematic of a content-management system 200 according to an embodiment of the present invention. Various portions of the content-management system may reside in one or more servers, such as servers $40_1$ to $40_N$, and/or one or more client systems, such as client system 20. Modules of the content-management system may be transmitted across a network, such as network 30, between one or more servers and client systems for execution. Content-management system 200 is configured to associate base content 205 with additional content 215, such that the additional content associated with the base content is relevant to the base content and/or relevant to a user accessing the base content. The base content might include web pages served to the client system 20 by one or more property servers $220_1$-$220_N$ or other servers. The web pages may be served according to a number of web based protocols, such as TPC/IP, HTTP, HTTPS or other protocols in use at the time. System servers $40_1$-$40_N$ may include property servers $220_1$-$220_N$. The property servers might include those servers associated with, for example, Yahoo! Launch, Yahoo! Finance, Yahoo! Movies, Yahoo! Health, Yahoo! News, Yahoo! Sports, Yahoo! Music, Yahoo! Weather or other property servers. The property servers may be servers that reside on single server computer or may reside on a number of server computers. Base content might include text, images, video, audio, animation, program code, data structures, formatted text, etc. For example, base content provided by a news server, such as the Yahoo! News server, might include a news story (text) and an accompanying image. The base content may be formatted according to the Hypertext Markup Language (HTML), the Extensible Markup Language (XML), Standard Generalized Markup Language (SGML) or other format in use at the time. Relevant content presented with the base content may be in the form of banner ads or links that point to the relevant content. The links may include, for example, URLs, wherein the targets of the URLs are the relevant content.

Figure 3:
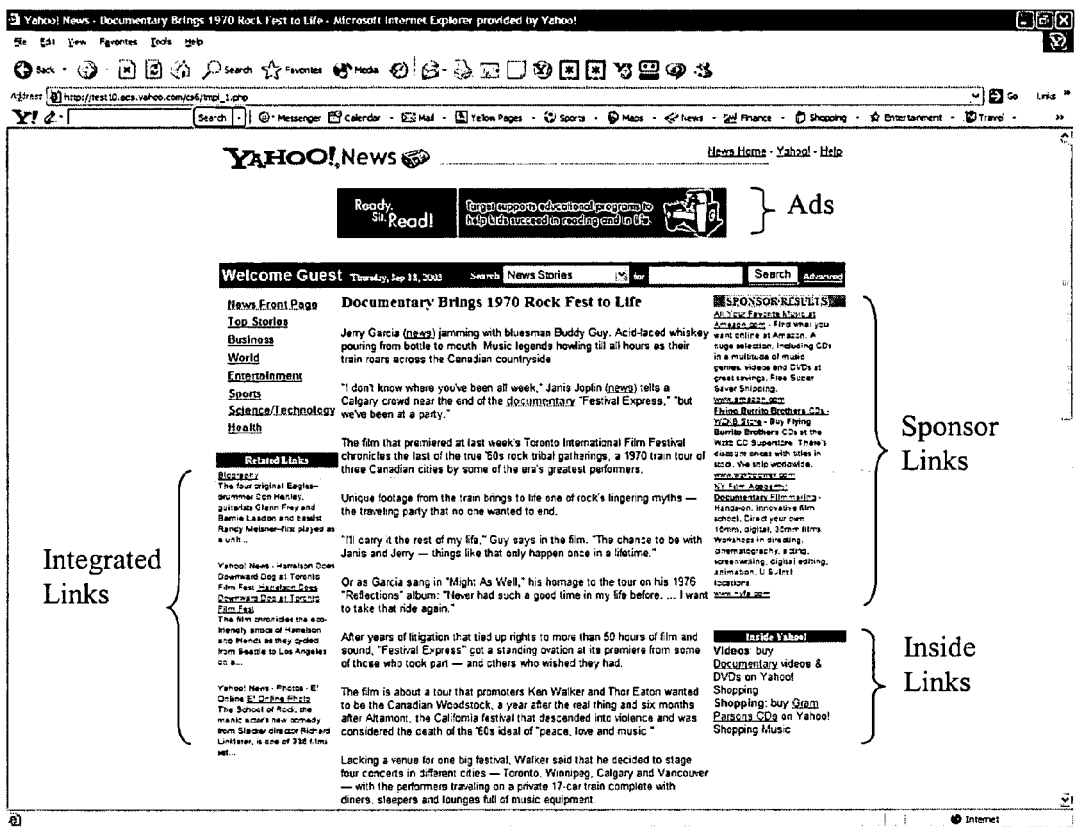
FIG. 3 is an example web page that might be published on a display of a client system and includes base content and relevant content according to one embodiment of the present invention.

FIG. 3 is an example web page that might be published on a display of client system 20 and includes base content 205 and relevant content 230 according to one embodiment of the present invention. The base content might include a news article, such as a news article about a music group. The base content may be provided by a property server, such as the Yahoo! News or Yahoo! Music property servers. The relevant content may include one or more advertisements, sponsor links, inside links (e.g., links to one or more property servers $220_1$-$220_N$), integrated links or the like. It should be understood that the web page shown in FIG. 3 is shown for exemplary purposes only and the web page may include other relevant content presented on the web page in a variety of formats, such as video, audio, pictures, text or the like.

Sponsor links might include links to sponsor sites and pages. Sponsors typically purchase keywords or units (e.g., keyword groups; described in detail below) that trigger the content-management system and/or property servers to request the sponsor links be published with the base content when the purchased keywords are in the base content, in the base content metadata or the like. Integrated links might include links to relevant content that is at an outside server or at a server associated with a provider of the content-management system. Integrated links might not include revenue generations. For example, keywords and/or units (sometimes also referred to as query units) that trigger the placement of an integrated link on a page might not be sold/licensed for the purpose of placing the link on the page. Outside servers might not be affiliated with the provider of content management server 200. For example, the provider of content-management system 200 might be Yahoo!, and the outside source might be an independent news agency that provides news content or the like to Yahoo!. Outside servers might be crawled to build an index or database of relevant content (described in detail below). Inside links might include links to property servers associated with a provider of content-management system 200 and might include links to property servers $220_1$-$220_N$. The property servers might include those associated with, for example, Yahoo! Launch, Yahoo! Finance, Yahoo! Movies, Yahoo! Health, Yahoo! News, Yahoo! Sports, Yahoo! Music, Yahoo! Weather or other property servers.

According to one embodiment, base content 205 is provided to content management servers 200 by property servers $220_1$-$220_N$. Alternatively, property servers $220_1$-$220_N$ might provide URLs to the content-management system that accesses the base content via the URLs. Base content might be provided in the form of HTML pages, XML pages or other formats in use at the time. Property severs $220_1$-$220_N$ might also provide configuration files 225 to the content-management system. Each configuration file 225 includes a set of rules that might be used by a web page parser 230 to set priorities for base content parsing. Each configuration file might include a unique set of parsing rules that are associated with the property sever providing the rules. For example, a news property, such as the Yahoo! News property, might provide rules for parsing titles of news articles, whereas a music property, such as the Yahoo! Music property, might not provide a rule for parsing titles of new articles. A music property, might alternatively, include a rule for parsing CD titles, which may be of higher relevance to the music property than the titles of new articles. One example set of parsing rules (e.g., for a news property) might include parsing titles, metadata keywords, metadata description, bold text, italicized text, proper nouns, anchor text, body text, and text characterized as important text. During a parsing process, all HTML tags or the like and other unwanted information may be cut from a piece of base content and the preceding text categories parsed from the base content. For example, a body text parsing rule might provide for the parsing of the first one or two paragraphs of articles and might provide that subsequent paragraphs not be parsed. According to another example, text characterized as important text that is to be parsed from a web page may be property server specific. For example, a sports property, such as the Yahoo! Sports property, may include rules that deem the names of sports teams as important text, whereas, a movie property may include rules that deem movie titles as important text. For base content not provided with a configuration file, such as a base content not served by a property server, the base content might be parsed by one or more sets of default rules that might be stored locally at web page parser 230.

According to one embodiment, subsequent to parsing base content, units and/or keywords are extracted from text parsed by an extraction module 232. Units might include one or more keywords and generally represent a single concept, such as a single concept that is integral to human thought. That is, the keywords in a unit would represent one concept verses the number of concepts that might be represented by the keywords taken individually or in varying groups. For example, the three keywords "New," "York," and "City" might form the unit "New York City," wherein the unit is not treated as three separate keywords (and possibly three or more different concepts) but is treated as a single keyword, or "unit" representing, for example, the single concept. The concept of the unit "New York City" is generally more aligned with natural thinking processes than the concepts of the three keywords contemplated disparately. For example, the keyword York taken disparately may be associated with the town of York in Great Britton, or the keywords New York taken together may be associated with the state of New York and not necessarily the city of New York.

Units might be extracted by extraction module 232 from parsed text based on a set of units in a unit-dictionary module 235. Unit-dictionary module 235 might include a list of all units that might be extracted from the parsed text. Units in the unit-dictionary module may include one or more keywords. The unit-dictionary module may be provided be a query-processing engine 237. Query-processing engine 237 may be configured to receive a number of keywords and form units from the keywords. The query processing engine may be configured to recognize that a single keyword may be a unit unto itself and need not be grouped with other keywords to form a unit. While the query-processing engine is shown in FIG. 2 as a module that is not included in content-management system 200, according to some embodiments, the query-processing engine may be included in system 200. For a detailed understanding of query processing engine 240, see U.S. Pat. No. 7,051,023 B2 [U.S. patent application Ser. No. 10/713,576, filed Nov. 12, 2003, entitled "System and Methods for Generating Concept Units from Search Queries"], which is incorporated herein by reference for all purposes and is owned by the owner of the presently described invention.

Units may be periodically added to or deleted from the unit-dictionary module, for example as units and/or keywords are sold. For example, an advertiser may want their ad displayed with a piece of base content if one or more specific units are in the piece of base content. Or a sponsor may want a link to their site displayed with the piece of base content if one or more specific units are in the piece of base content. The advertiser, sponsor or the like would then "purchase" the unit to provide ad or sponsor link placement on a page with the base content. Further, the advertiser, sponsor or the like, might even pay a fee every time the unit appears in a piece of base content and the advertiser's ad is displayed or the sponsor's link is displayed with the base content. Addition fees might also be collected from an advertiser or sponsor is a user selects (or "clicks") the ad or sponsor link.

Additional unit-extraction rules may be provided to the extraction module, for example, by the property servers. The unit extraction rules might provide for extracting units not in the unit-dictionary module or might provide that given units should not be extracted from parsed text although the units are in the unit-dictionary module. The unit-extraction rules might include extracting a unit based on an amount of revenue generation associated with the unit. For example, if a unit included in the unit-dictionary module has not been sold and does not have an associated revenue-generation amount, the unit-extraction rules may provide for not extracting the unit from parsed text. Different sets of unit-extraction rules might be provided by the various property servers.

Keyword might also be extracted based on a set of keyword-extraction rules. The keyword extraction rules may be provided in configuration files 225 provided by property servers $220_1$-$220_N$. The keyword-extraction rules may be applied uniformly to all parsed text or may be applied to base content provided by a given property server and might not applied to base content provided by other property servers. For example, one set of keyword-extraction rules might be applied to base content provided by the Yahoo! Music property and a different set of extraction rules may be applied to base content provided by the Yahoo! News property.

Subsequent to the extraction of units (including either single keyword units or multiple keyword units) from parsed text, the units are transferred to unit-ranking module 245 that is configured to rank the units. Units might be ranked based on a number of criteria including, for example, i) an "amount of revenue generation", ii) a relevance score, iii) a user relevance metric or other criteria. An amount of revenue a unit generates might be based on an amount a subscriber, advertiser, sponsor, etc. is willing to pay for their relevant content to be presented to a user along with the base content. For example, a light-duty truck manufacturer may purchase/license the units "truck," "pick-up truck," and "light-duty truck." The unit light-duty truck may be highly relevant to the types of trucks produced by the manufacturer, whereas, the units pick-up truck and truck may be of less relevance. Accordingly, the manufacturer would typically pay a larger fee for their ads (i.e., relevant content) to be placed beside base content having the unit light-duty truck as compared with the fee paid for the placement of ads next to base content having the units pick-up truck or truck. Accordingly, the units pick-up truck and truck would have lower revenue-generation amounts than the unit light-duty truck.

Relevance scores indicate a degree of relevancy between units and base content. For example, the units light-duty truck, pick-up truck, and truck may be highly relevant to a news article about new trucks that discusses various features and advantages of new light-duty truck models. Accordingly, the relevance scores of these units in relation to the news article would be high. The relevance scores for these units would be lower, however, for a news article that discusses new four-door sedans and mentions briefly that none of the manufacturers of the sedans manufactures light-duty trucks.

A determination of relevance scores for units with respect to a piece of base content may be determined according to a number of methods and/or criteria. For example, a unit may have a high relevance score if the unit appears greater than or equal to a given number of times in a piece of base content. Further, a given unit may have a higher relevance score than other units, if the given unit is in the content a greater number of times than the other unit.

Further, relevance scores may be based on the location of a unit in a piece of base content or an indicator within the base content. For example, a unit might have a high relevance score if the unit is in a title, metadata keywords, metadata description, anchor text, body text, is designated by formatting, such as bold, italics, and/or text characterized as important text by some indication in the base content.

A unit that is a proper noun may be deemed important text and may be assigned a relatively high relevance score. Units deemed important units might be different depending on the particular property server that supplies the base content to the content-management system. For example, a unit that includes the name of a sports team might be deemed an important unit for a sports property, but might not be deemed an important unit for a movie property.

FIG. 4 is an example chart that includes a number of units and their associated revenue-generation amounts and relevance scores. The example chart might be for a news article that describes various truck models. The revenue-generation amounts might be dollar values or indexed values and the relevance scores might have a range of zero to one inclusive (or other useful range). In the particular example of FIG. 4, the unit light-duty truck has a relatively high revenue-generation amount (or dollar value) and a relatively high relevance score, whereas the units pick-up truck, truck, and car have relatively lower revenue-generation amounts and relatively lower relevance scores.

According to one embodiment, unit-ranking module 245 is configured to generate an overall-relevance score for each unit associated with a piece of base content or for a select set of units. For example, a set of rules may be applied to a select set of units for which overall-relevance score are calculated. The set of rules may include a rule for calculating overall-relevance score only for units that have a revenue-generation amount above a threshold or simply for units that have a non-zero revenue-generation amount. Overall-relevance scores are a metric of relevance of a unit to a piece of base content based on a number of factors, such as revenue-generation amounts, relevance scores, a user relevancy metric or the like. For example, an overall-relevance score might be based on a weighted linear combination of the revenue-generation amounts and relevance scores. A formula for calculating overall-relevance scores for units might be written as:

$$ORS = W*RGA + (1-W)*RS,$$

wherein ORS is an overall-relevance score, W is a weighting factor, RGA is a revenue-generation amount, and RS is a relevance score. Weighting factors may be provided by the property server supplying the base content, for example, the weighting factors might be supplied to the content-management system in configuration files 225. Each property server might supply different weighting factors. For example, a news property might supply a weighting factor that places a relatively large emphasis on relevance scores as compared to revenue-generations amounts. Such emphasis may be placed on relevance scores as users of the news property may be more interested in obtaining related news articles rather than viewing ads and making purchases based on the content of a new article. Alternatively, a music property or a movie property might provide weighting factors that place relatively higher emphasis on a revenue-generation amount than on a relevance score. For example, users of music properties and movie properties may be more likely to purchase music or movies related to an article about music or a movie.

According to one embodiment, units, keywords, revenue-generation amounts, relevance scores, weighting factors, overall-relevance scores and other data might be cached in memory 250, memory 290, memories associated with the property servers or other memories. These data may be retrieved from memory to associate base content with relevant content. The formation of associations between base content and relevant content is described in detail below.

According to one embodiment, each piece of additional content (from which relevant content is identified) is associated with at least one unit or keyword. For example, each advertisement in an advertisement database 270, each piece of content associated with a sponsor link 275, each piece of content associated with an integrated link 280, and each piece of content associated with an inside link 285 is associated with at least one unit or keyword. The additional content might be provided to content-management system 200 with one or more units or keywords or the units or keywords may be extracted from the additional content or extracted from information associated with the additional content. For example, an advertiser may provide units or keywords with their advertisements to ensure that purchased units or keywords appearing in base content match units and/or keywords supplied with their advertisements. Additional content that is not provided with units and/or keywords may be crawled to extract units and/or keywords. Additionally, the landing pages of a link may be crawled for units and/or keywords. Also, the landing pages of a advertisements might be crawled for units and/or keywords. Home pages associated with advertisements may also be crawled for units and/or keywords. Additionally, the URLs for advertisements and links may be parsed and units and/or keywords extracted from the parsed URLs. The keywords may be indexed and cached in a memory 250, memory 290, memories associated with the property servers or other memories.

Units may be extracted from additional content based on the units in unit-dictionary module 235 or by unit extraction rules discussed above. Keywords might be extracted from additional content based on the keyword extraction rules discussed above. Units and/or keywords might be extracted from the additional content by a content-processing module 295. According to one embodiment, content-processing module 295 includes a web-page parser 300, a unit-dictionary module 305, a unit extraction module 310, and a cache memory 315. Web-page parser 300, unit-dictionary module 305, unit extraction module 310 may be respectively configured to operate similarly to web-page parser 230, unit-dictionary module 235, and unit extraction module 232 described above. Units and/or keywords 320 extracted from additional content may be cached in cache memory 315, cache memory 250 or other memory. While web-page parsers 230 and 300 are shown as different modules in FIG. 2, these modules might be the same modules and form part of content-management system 200. Further, while unit-dictionary modules 235 and 305 are shown as different modules in FIG. 2, these modules might be the same module and form part of content-management system 200. Further yet, while unit-extraction modules 232 and 310 are shown as different modules in FIG. 2, these modules might be the same module and form part of content-management system 200.

According to one embodiment, associations between base content and relevant content are generated by a unit-matching module 325. Associations link a piece of base content to a piece of relevant content. The associations might be data base links that are URLs and point to the base content and relevant content. An association between a piece of base content and a piece of relevant content might be formed if the same units are extracted for the piece of base content and the piece of relevant content. An association might also be formed if a unit extracted for a piece of base content matches a unit and/or keyword extracted from a piece of relevant content. For example, the unit light-duty truck may be associated with i) a given piece of base content, ii) an advertisement, and iii) one or more links. As the unit light-duty truck is common to the base content and relevant content, an association is created between the base content and the relevant content. According to another embodiment, associations between base content and relevant content are formed if their units (or keywords) are in sets of related units (or keywords). For example, a set of related units might include the units light-duty truck, pick-up truck and truck as these units are related by the base concept truck. An association may be formed between a piece of base content that includes the unit light-duty truck and an advertisement that includes the unit pick-up truck as these units are in the same set of related units. Associations between base content and relevant content may be cached in memory 250, memory 315, memories associated with the property servers or other memories. Units and/or keywords compared by unit-matching module 325 may be retrieved from memory 250, memory 315, or may be extracted in real time to form associations between base content and relevant content.

Associations cached in memory may be stamped with a creation date and/or an expiration date. One or both of the dates may be used as an indicator for when the association should not longer be used. Based on the expiration dates, base content may be reprocessed by content-management system 200 to refresh as set of association or to generate new associations. Refreshed and new associations may be cached for later retrieval and use.

According to one embodiment, one or more units and/or keywords associated with a piece of base content may be compared and matched with units and/or units associated with relevant content. For example, a unit having a highest overall-relevance score may be compared and matched with units associated with relevant content. Or a number of units having overall-relevance scores greater than or equal to a threshold score may be compared and matched.

As described above, when a user selects a piece of base content for use (e.g., viewing, listening, processing, etc.) the base content is served with relevant content that is associated with the base content. When the base content is served, associations between the base content and relevant content are retrieved from memory, and based on the stored associations, ads, sponsor links, integrated links and/or inside links are presented to the user, such as a human user using client browser 20. See, for example, FIG. 3. According to an alternate embodiment, unit extraction and associations are performed in real time, if base content is served and associations to relevant content are not available in a cache or other memory. Subsequent to forming the associations in real time, the base content is served with the identified relevant content. Once associations are formed in real time, the associations may be cached for future access.

According to one embodiment, click through rates are accumulated for relevant content served with base content and, based on the click through rates, a web page presentation of the base content and relevant content is changed. As referred to herein, a click through rate is a number of times a piece of relevant content is selected for use by a user in view of the number of times the relevant content is served to a user. If a given piece of relevant content has a higher click through rate than another piece of relevant content, the given piece of relevant content may be published in a more prominent position on a web page. For example, the given piece of relevant content may be placed higher on a list than the other relevant content. Alternatively, the given piece of relevant content may supplant the other relevant content when the web page is published.

Figure 5:
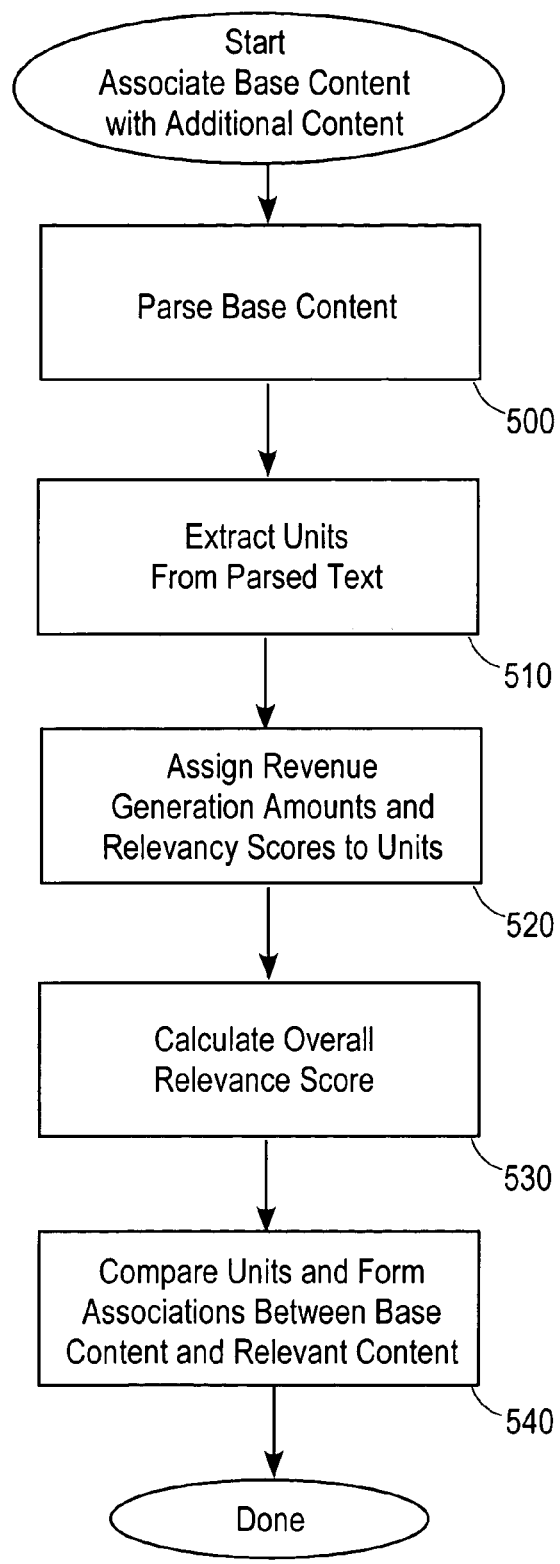
FIG. 5 is a high-level flowchart having steps for associating and serving relevant content with a piece of selected base content according to an embodiment of the present invention.

FIG. 5 is a high-level flowchart having steps for forming associations between base content and additional content that is relevant to the base content according to an embodiment of the present invention. The high-level flowchart is merely illustrative of an embodiment incorporating the present invention and does not limit the scope of the invention as recited in the claims. One of ordinary skill in the art would recognize variations, modifications, and alternatives.

At 500, a piece of base content is parsed by a web page parser to extract desired text. At 510, a set of units are extracted from the text based on units included in a unit-dictionary. At 520, the units are assigned relevance scores and revenue-generation amounts. At 530, an overall-relevance score is calculated for each unit. The overall-relevance score may be a function of weighted relevance scores and weighted revenue-generation amounts, wherein the weights place an emphasis on either the relevance scores or the revenue-generation amounts. At 540, a unit having a highest overall-relevance score, or one or more units having overall-relevance scores greater than or equal to a threshold score, are compared with units and/or keywords associated with additional content that may be relevant to the base content. The additional content might include ads in an ad database, sponsor content supplied by a sponsor, integrated content supplied by an integrated server, and/or inside content supplied by an inside server. If the units extracted from the base content and the additional content match or are sufficiently similar (e.g., assigned to a common set), the additional content is deemed relevant content, and at least one association is formed between the base content and relevant content. The formed associations may be used to serve the base content and relevant content to a user, such as a human user using a client browser 20.

The foregoing described steps may be executed in real time as base content is requested by a user. Alternatively, the steps may be executed asynchronously. That is, content-management system 200 may form associations between base content and relevant content and cache the associations prior to receiving a user's request for base content. The associations may subsequently be used to serve the base content and associated relevant content when the user requests the base content.

A property server having base content may schedule an appointment with the content-management system to have its base content crawled for keywords and to have associations formed between base content and relevant content. Scheduling may be periodic or may be established as property servers acquire new base content. Alternatively, as expiration dates for associations come due, property servers may be configured to resubmit base content (or URLs pointing to the base content) to the content-management system for the formation of new associations or refreshing the expired associations.

Figure 6:
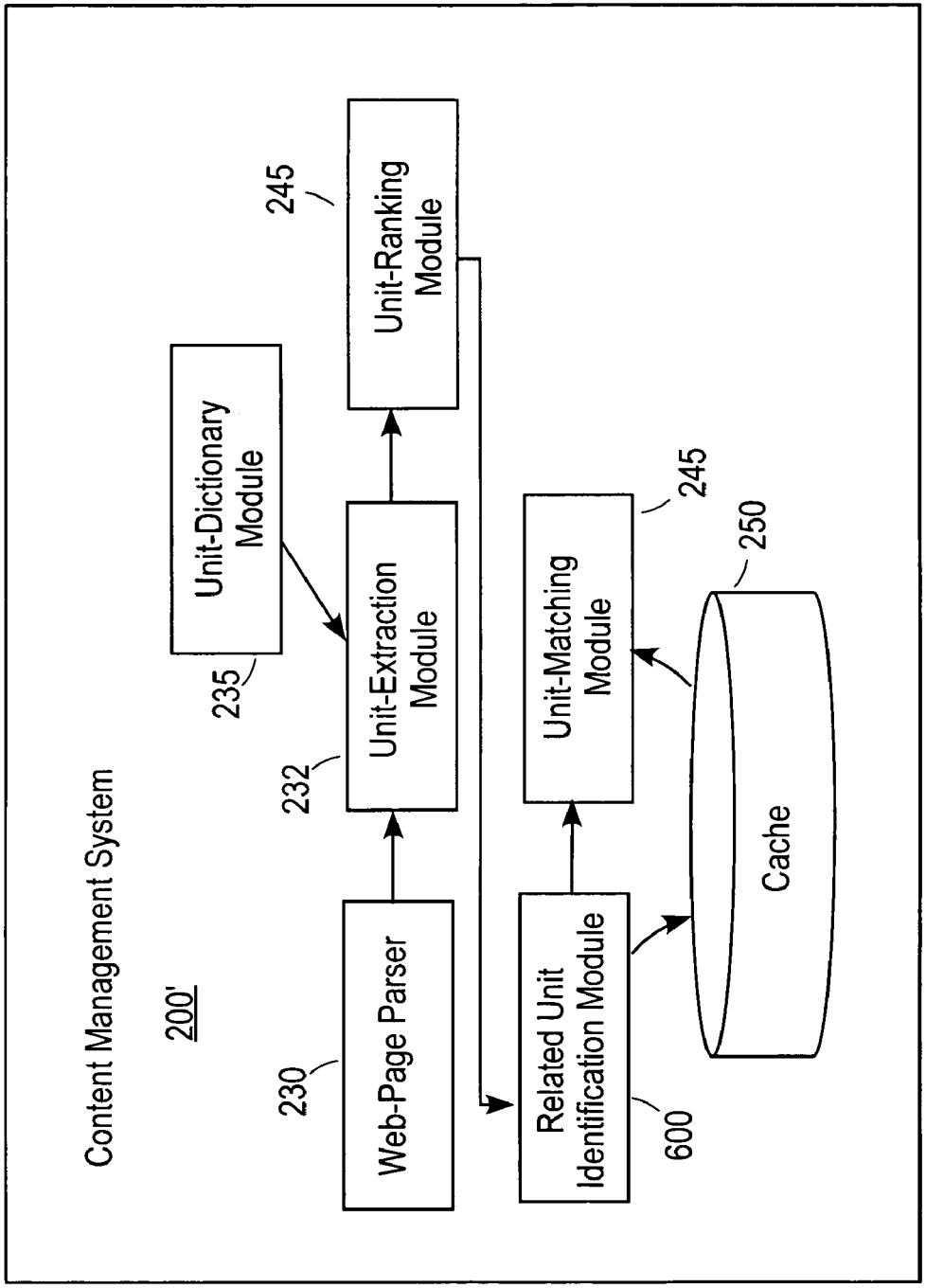
FIG. 6 is a simplified schematic of a content-management system according to another embodiment of the present invention.
Figure 7:
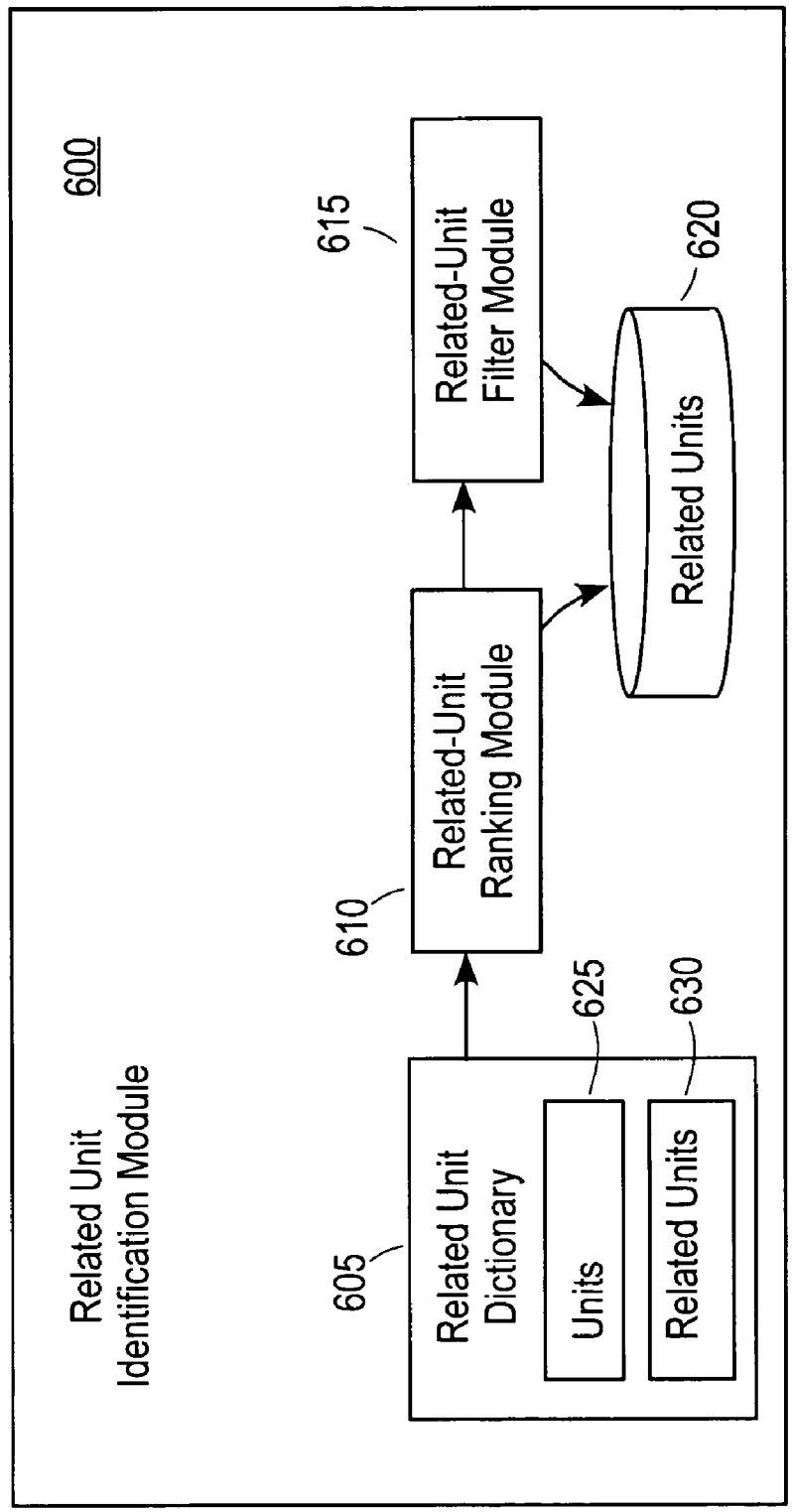
FIG. 7 is a simplified schematic of a content-management system according to another embodiment of the present invention.

FIG. 6 is a simplified schematic of a content-management system 200' according to another embodiment of the present invention. The same numeral scheme used above to identify modules of content-management system 200 will be used to identify the same or similar modules of content management system 200'. Content-management system 200' differs from content-management embodiments described above in that content-management system 200' includes a related-unit module 600. As a number of modules of content-management system 200' have been described above with respect to content-management system 200, the present description primarily describes related-unit module 600. Any variation in function or form of previously described modules will be readily apparent to those of skill in the art.

Related-unit module is configured to identify at least one "related unit" that is related to a unit that is extracted from a piece of base content or derived from another source of units (described below). The related unit might then be used by the unit-matching module to identify relevant content that is relevant to the related unit. Or the related unit and the unit extracted from the base content might be used by the unit-matching module to identify the relevant content. It may be desired to identify and use related units for identifying relevant content, as the related units may have higher relevance to a user, higher relevance to the base content, or may have a higher revenue-generation amount. For example, a unit extracted from a piece of base content might be the unit "real estate." Related units that might be related to the unit real estate might include "San Francisco real estate" and "San Francisco real estate agent." The related unit San Francisco real estate agent may have a revenue-generation amount of $1.50 as compared with a revenue-generation amount of $0.10 for the unit real estate. Or the related unit San Francisco real estate agent may have a relatively higher relevance to a user than the unit real estate, as it may be known that the user is a San Francisco resident looking for real estate. The identification of related units is presently described in further detail.

According to one embodiment, related-unit module 600 includes a related-unit dictionary 605 and is configured to receive one or more units (e.g., a unit having a highest relevance score) from unit-ranking module 245, and based on the related-unit dictionary and the received unit, identify related unit that may be used by the unit-matching module to identify relevant content to serve with a piece of base content. The related-unit dictionary might include units and sets of related-unit, such that each unit is associated with a set of related-units. FIG. 8 shows an example related-unit dictionary 605 that includes a number of units 610 and their associated sets of related units 615. For example, the unit real estate 610*a* may be associated with a set of related units 615*a* that might include the related units San Francisco Real Estate, Los Angeles Real Estate, San Francisco Real Estate Agent, Los Angeles Real Estate Agent, San Francisco Rental Property, etc. As shown in FIG. 8, related units in a set of related units (e.g., set 615*a*) might or might not include their associated unit (e.g., unit 610*a*). It should be understood that the related-unit dictionary of FIG. 8 is shown for exemplary purposes. Related-unit dictionaries, according to various embodiments of the present invention, may include hundreds of units, thousands of units, or more units, and may include one or more related units associated with each of the units.

The related units in each set of related units may be initially ranked in an initial ranking to identify related units that might be used by unit-matching module 325 to identify relevant content for serving with a piece of base content. The related units may be initially ranked according to a number of criteria. According to one initial ranking scheme for related unit, the related units in each set of related units might be ranked according to the search frequency of the related units, the revenue-generation amounts of the related units and/or other useful criteria. For example, a related set of units might be ranked in a first ranking step according to a search frequency, and ranked in a second ranking step according to revenue-generation amounts. For example, if a unit for dealers of a certain car model has a relatively higher search frequency by users than a unit for repair shops for the car model, then the unit for the dealers (e.g., unit "car model dealer") might be ranked higher than the unit for the repair shops (e.g., unit "car model repair shop"). Subsequent to ranking the related units based on search frequency, a select number of the highest ranking related units (e.g., units ranked above a threshold) might be ranked a subsequent time based on revenue-generation amounts. For example, the three highest ranking related units based on a search frequency might be selected for subsequent ranking based on revenue-generation amounts. For example, the three highest ranking related units based on search frequency might be car model owner's club, car model dealer, and car model repair shop. The ranking of these related units based on revenue-generation amounts might be i) car model dealer, ii) car model repair shop, and iii) car model owner's club, as dealers of the car model may be contracted to pay $1.50 for ad placement with the base content, whereas the car model repair shop might be contracted to pay $0.45 for ad placement, and the car model owner's club might be contracted to pay $0.02 for the placement of their sponsor link with the base content. According to some embodiment, the steps for forming the initial ranking might be reversed, with a first ranking step and thresholding based on revenue-generation amounts and a second ranking step based on search frequency.

Figure 9:
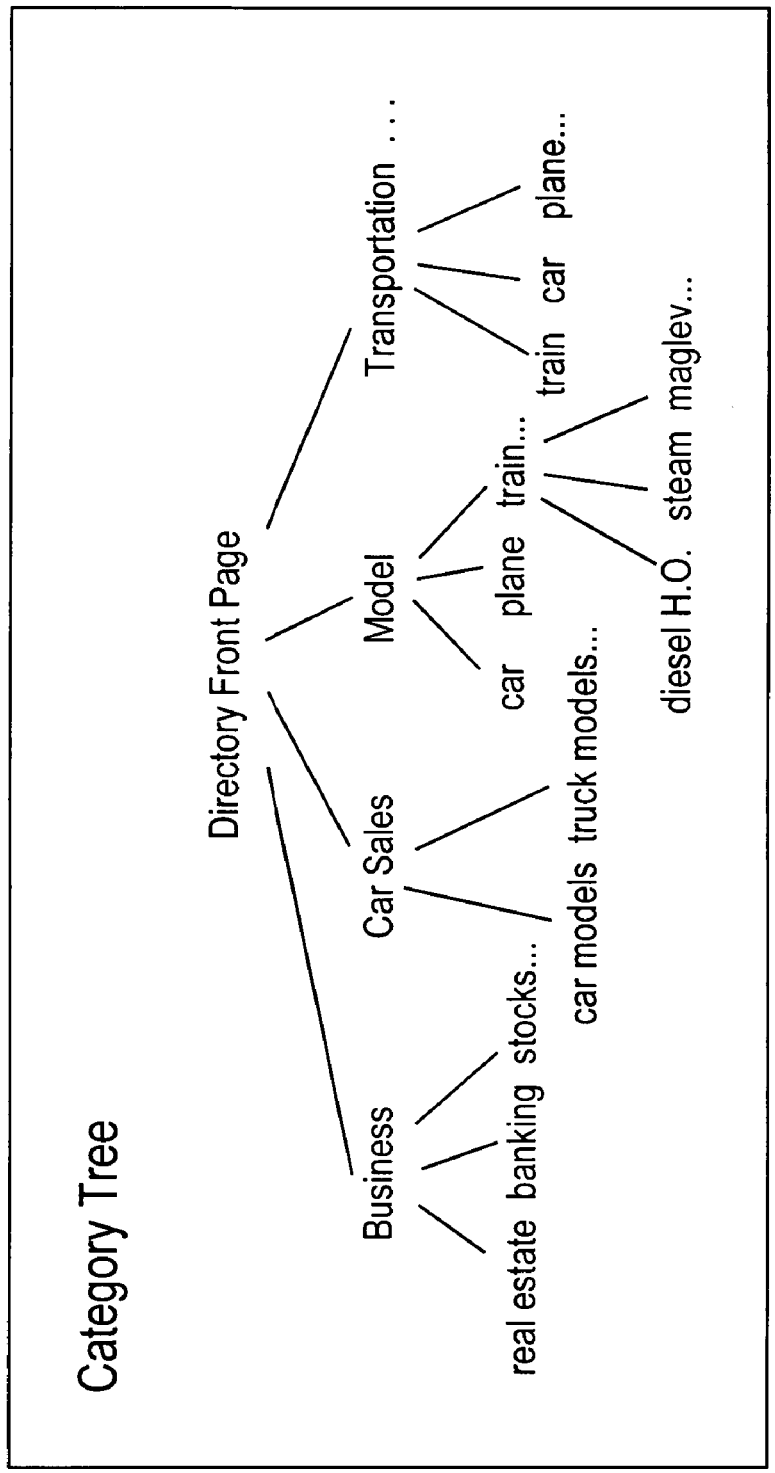
FIG. 9 is a diagram of a tree hierarchy that includes a number of categories according to an embodiment of the present invention.

According to one embodiment, each time a related unit is requested, the related-unit model selects a number of highest ranking units (e.g., units at or above a threshold) from the initial ranking (described above) and according to a subsequent ranking, and ranks these related units based on a parent category of the unit transferred from unit-ranking module 245 to the related-unit-identification module 600. For example, the unit "train" may be transferred to the related-unit-identification module for the identification of one or more related units that are related to this unit. The unit train might be the name of a category in a tree of categories, and the parent category of train might be the unit "model." FIG. 9 is a diagram of an example tree hierarchy of that include a number of categories (business real estate, auto sales, car model, model, train, etc.). It should be understood that the tree hierarchy of FIG. 9 is shown for purposes of example, and that numerous categories might be included in a tree hierarchy. FIG. 9 illustrates, for example, that the unit train might be associated with two parent categories: model and transportation, and might be associated with two sets of related units, one set for each parent category. According to a subsequent ranking, in the first set of related units for train, related units that include the unit "model" would be ranked relatively higher than other related units not including the unit model. Therefore, according to the subsequent ranking, the related units model train and model train collector's club would be ranked higher than the related units Cal Train, Municipal Train, Light Rail, Muni Rail, etc. Further, according to a subsequent ranking, in the second set of related units for the unit train, related units that include the unit transportation would be ranked relatively higher than other related units not including the unit transportation.

According to one embodiment, one or more (e.g., two) related units that are the highest ranking according to the subsequent ranking are transferred to unit-matching module 245 so that relevant content associated with these related units may be served with the base content. According to another embodiment, these related units that are the highest ranking might be cached in a cache 250 for future relevant content identification, for building a statistical database or for other purposes.

According to another embodiment, related units that are used to identify relevant content (i.e., related units transferred to unit-matching module 245 or cache 250) are identified in sets of related units based on a number of units that might be extracted from a piece of base content or supplied from other units sources. For example, a first unit U1 and second unit U2 might be extracted from a piece of base content and transferred to the related-unit-identification module. A set of related units associated with U1 may be searched to identify related units that include the unit U2. One or more (e.g., two) related units that include the unit U2 might be transferred to the unit-ranking module for related content identification and serving. For example, the units real estate U1 and San Francisco U2 might be extracted from a piece of base content or supplied from another source of units. The set of related units 615a associated with real estate U1, might be scanned for related units that include the unit San Francisco U2. Related units including San Francisco U2 in set 615a include San Francisco Real Estate, San Francisco Real Estate Agent, and San Francisco Rental Property. One or more (e.g., two) of the related units San Francisco Real Estate, San Francisco Real Estate Agent and San Francisco Rental Property might be transferred to the unit-matching module for relevant content identification and serving. One or more related units may be transferred to the unit-matching module based on revenue-generation amounts and/or search frequencies. For example, the related units San Francisco Real Estate Agent may be transferred to the unit-matching module as this unit may have a relatively higher revenue-generation amount (e.g., $1.50) than the related unit San Francisco Real Estate (e.g., may have a revenue-generation amount of $0.35) and the related unit San Francisco Rental Property (e.g., may have a revenue generation amount of $0.20). Or the related unit San Francisco Real Estate may be transferred to the unit-matching module as this unit has a higher search frequency than San Francisco Real Estate Agent and San Francisco Rental Property. According to one embodiment, if none of the related units in a set of related units for the unit U1 includes the second unit U2, then one or more (e.g., two) of the related units that are highest ranking based on search frequency, revenue-generation amounts, and/or parent category matching are transferred to the unit-matching module for relevant content identification and serving.

While units have been described above as being extracted from base content, units might be derived from other sources. For example, for certain types of content, such as personal content (e.g., e-mail, chat room discussions, discussion groups, message boards and the like), it might not be inappropriate to extract units. According to one embodiment, rather than extract units from person content, units for the categories to which the personal content is associated might be used for identifying related units for further relevant content identification. For example, a discussion group might be assigned to category having the name/unit C1, and the unit C1 might be used for relevant content identification. For example, a category might be established for a discussion group for light-duty trucks. The unit C1 for the category might be light-duty truck, and this unit might be used by related-unit-identification module 600 to identify related units. Those of skill in the art will know of other sources of useful units that might be used to identify relevant content.

Figure 10:
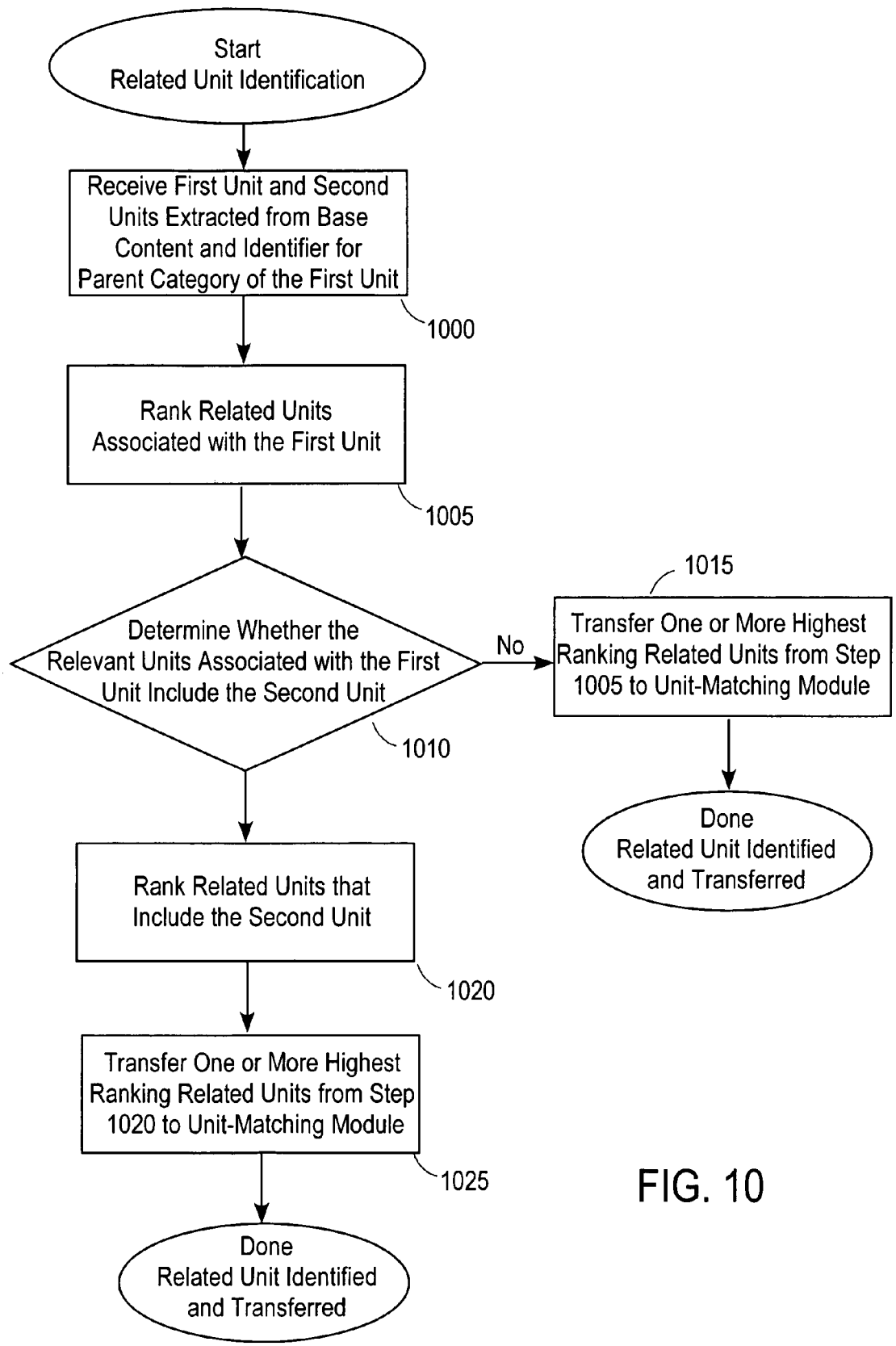
FIG. 10 is a high-level flow chart having steps for identifying related units based on another unit.

FIG. 10 is a high-level flow chart having steps for identifying related units based on another unit. The high-level flowchart is merely illustrative of an embodiment incorporating the present invention and does not limit the scope of the invention as recited in the claims. One of ordinary skill in the art would recognize variations, modifications, and alternatives, including the rearrangement of the sequence of steps shown in the high-level flow chart. At 1000, a first unit and a second unit are received by a related-unit-identification module. According to some embodiments, an identifier (e.g., a unit) for the parent category of the first unit is also received by the related-unit-identification module. These units might be units that are extracted from a piece of base content or are from another source. At 1005, related units in a related-unit dictionary that are associated with the first unit are ranked based on one or more of a revenue-generation amount of the related units, a search frequency of the related units, and the identifier of a parent category of the first unit. The identifier might include a unit that identifies the parent category. At 1010, determine whether the related units associated with the first unit include the second unit. If none of these related units includes the second unit, then one or more (e.g., two) of the highest ranking units identified in ranking step 1005 are transferred to a unit-matching module for relevant content identification and serving, step 1015. If related units are identified in step 1010 that include the second unit, these related units are ranked based on a revenue-generation amount and/or a search frequency, step 1020. At 1025, one or more (e.g., two) of the highest ranking related units ranked in step 1020 are transferred to the unit-matching module for relevant content identification and serving. It should be understood that if a single related unit is identified that includes the second unit, then this single related unit may be transferred to the unit-matching module without performing ranking step 1020. According to one embodiment, steps 1010, 1020, and 1025 may be skipped if a single unit is received by the related-unit identification module. That is, once the related units that are associated with the received unit are ranked, one or more of the highest ranking related unit may be transferred to the unit-matching module for relevant content identification and serving.

Figure 11:
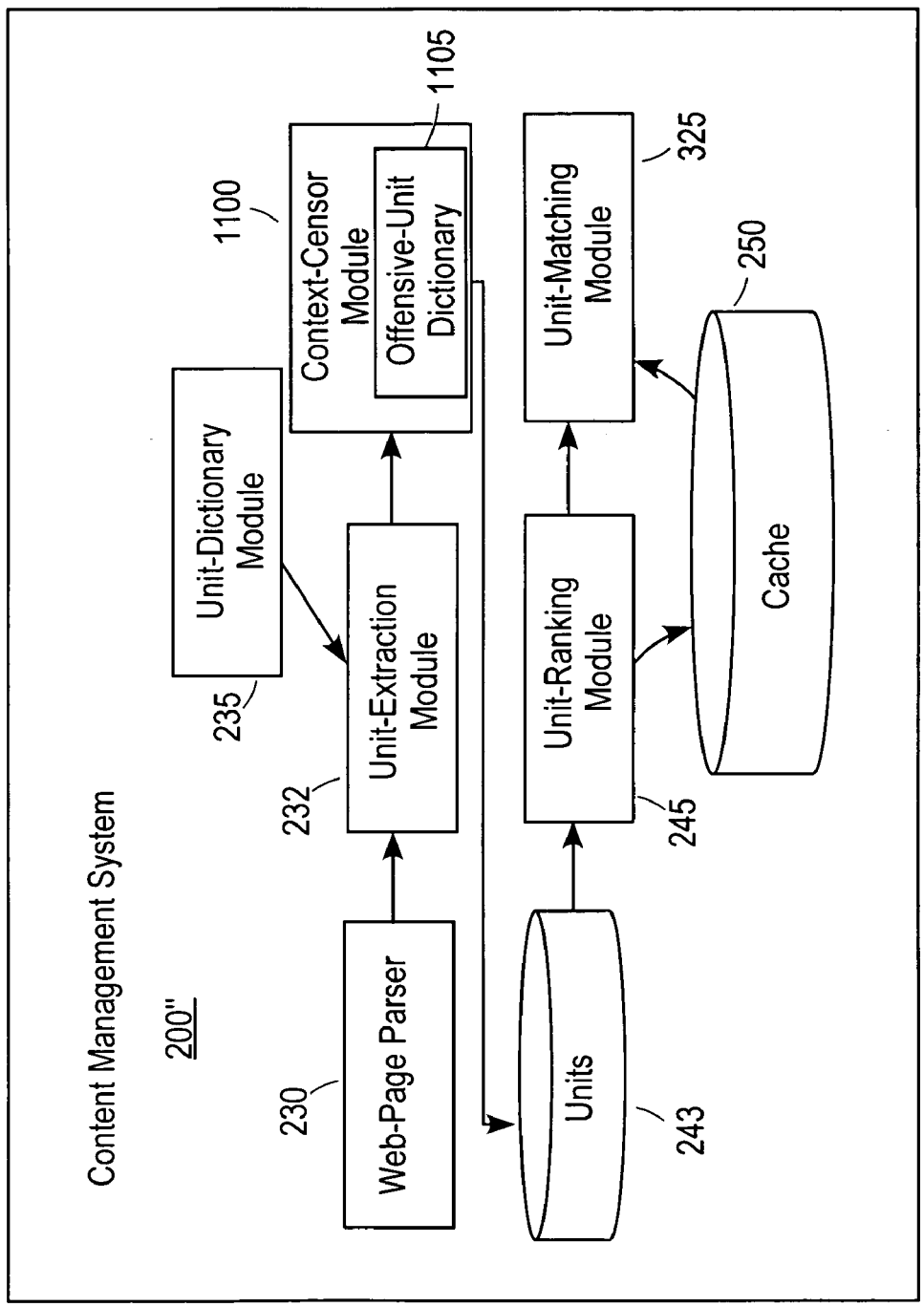
FIG. 11 is a simplified schematic of a content-management system according to another embodiment of the present invention.

FIG. 11 is a simplified schematic of a content-management system 200" according to another embodiment of the present invention. Content-management system 200" differs from content-management embodiments described above in that content-management system 200" includes a context-censor module 1100. Content-censor module 1100 may be configured to regulate (e.g., limit and/or stop) the presentation of base content with relevant content, if the combined presentation of the base content and the relevant content might offend an advertiser, a sponsor, a user, a provider of the content-management system or others. For example, an advertiser or sponsor might be offended if their respective advertisements or sponsor links are displayed with base content, ads, or links that place the advertiser or sponsor in a negative light. For example, an advertiser may not want their ads published on a web page with base content that discusses tragic events (e.g., criminal activity, personal tragedy, terrorism, epidemics, etc.) or controversial issues (war, racism, etc.). According to another example, advertisers and sponsors may not want their ads or links placed with base content, ads, or links that may damage a trademark, such as making the advertiser or sponsor appear to be attempting to profit from their trademark unfairly, diluting their trademarks or the like. Advertisers and sponsors might not want their ads or links placed with base content, ads, or links, such that the advertiser or sponsor might appear to be attempting to profit from tragedy. For example, an airline company may not want their advertisements for discount coupons placed on a page with a news article about the plane crash of another airline company. Serving an ad for a discount coupon with the plane crash article may cause the customers of the airline to view the airline negatively, in that the airline company might be perceived as attempting to profit from another's tragedy. Context censor module 1100 is configured to regulate (e.g., limit or stop) the presentation of ads, sponsor links, integrated links, inside links, and base content that might offend an advertiser, a sponsor, a user or others. The regulation of ad placement and link placement with base content (e.g., on web page) by censor module 1100 is presently described in further detail.

According to one embodiment, a list of known offensive units is collected in an offensive-unit dictionary 1105. The offensive units in the offensive-unit dictionary might be units that have been demonstrated to offend a group of readers of these offensive units. Offensive units in the offensive-unit dictionary might include units regarding war, crimes, criminal court trials, terrorism, violence, epidemics, disease, racism, murder, sexual conduct, personal tragedy (e.g., car, plane, and train crashes), curse words, natural disaster, obscenity, etc. According to one embodiment, offensive units included in offensive-unit dictionary 1105 are assigned scores, for example, from 0 to 1, inclusive, wherein a relatively higher score might represent a relatively higher degree of offensiveness and a relatively lower score might represent a relatively lower degree of offensiveness. For example, some offensive units might be known to have relatively high offensiveness (e.g., as determined by a group of readers), and might be assigned a score of 1, whereas other offensive units might have relatively lower offensiveness and might be assigned a lower score, such as 0.1. These scores might be adjusted as additional data is gathered regarding the offensiveness of the offensive units. For example, an offensive unit that is initially assigned a score of 0.1, might be assigned a score of 0.5 if it is determined that a demographic a users requesting base content are relatively more offended by the offensive unit than a test group of readers who assigned the initial score. Moreover, an offensive unit initially assigned a score of 1.0 might be assigned a lower score if it is determined, the offensive unit has a tendency to offend users less than might have originally been considered by a test group of readers. While rescoring has been described as being based on the degree to which users are offended by the offensive units, rescoring might be based on other criteria, such as advertiser preferences, sponsor preferences or other criteria. Table 1 shows an example list of offensive units and their associated scores that might be included in offensive-unit dictionary 1105.

TABLE 1

| Offensive Unit | Score |
|---|---|
| plane crash | 1.0 |
| murder | 1.0 |
| kill | 1.0 |
| train wreck | 1.0 |
| mayhem | 0.9 |
| tornado | 0.6 |
| earthquake | 0.5 |
| drugs | 0.5 |
| oil spill | 0.1 |
| blackout | 0.1 |

It should be understood that the offensive units included in the offensive-unit dictionary of Table 1 are shown for example purposes, and that a number of alternate and/or additional offensive units might be included in other embodiments of offensive unit dictionaries. According to some embodiments, an offensive-unit dictionary might include hundreds, thousands, or more offensive units depending, for example, on specific applications, test-readers group, users, advertisers, sponsors, a provider of the content management system, independent content providers or the like.

According to one embodiment, to determine whether pieces of base content might be served with ads, sponsor links, inside links, integrated links or the like, each piece of base content requested by a user is categorized as "sensitive" or "non-sensitive" based on an "offensive-unit score." The offensive-unit score might include the total of all of the scores of the offensive units included in the piece of base content. The offensive-unit score might be compared to a threshold score to determine whether the base content is sensitive or non-sensitive. For example, a threshold score might be 3, and a piece of base content might be classified as sensitive if the piece of base content has an offensive-unit score greater than 3, and might be classified as non-sensitive if the piece of base content has an offensive-unit score that is less than or equal to 3. An exemplary piece of base content having the offensive units (from Table 1) murder, kill, train wreck, mayhem, tornado, (for example for a news article about a train wreck caused by tornado) may have the offensive-unit score 4.5, and might be classified as sensitive. According to an alternate example, for a new article that has the offensive units train wreck and tornado, this news article might be classified as non-sensitive, as the offensive-unit score for the article may be 1.6.

According to one embodiment, other units that are not included in the offensive-unit dictionary, but that include those units that might be extracted from a piece of base content for identifying additional content that might be relevant to the base content are assigned "offensiveness scores." Offensiveness scores might be binary indicators to indicate offensiveness or non-offensiveness. These offensiveness scores might alternatively have three indicators to indicate offensiveness, non-offensiveness, and neutrality. For example, these units might be assigned an offensiveness score of 1 to indicate offensiveness, and non-offensive units might be assigned an offensiveness score of −1 to indicate non-offensiveness. Units that are neutral might be assigned the offensiveness score 0. According to yet another embodiment, offensiveness score might include a spectrum of scores (e.g., more than three scores) as discussed above.

Units used for relevant content identification might be assigned offensiveness scores based on a category that the units are associated with. A category (e.g., in a category tree) might be determined to be offensive or non-offensive and the offensiveness score for the category might be assigned to each unit associated with the category. It might be determined that a category for travel and transportation is an offensive category and might be assigned the offensiveness score of +1. Alternatively, categories for books, home, law and legal research might not be non-offensive and might each be assigned the offensiveness score of −1. Alternatively, if sufficient data is not available to determine whether a category is offensive, the category might be assigned the neutral offensiveness score of 0. According to one embodiment, offensiveness scores for categories might be based on a number of pieces of base content for the categories, and based on a number units that might be extracted from the pieces of base content for use in identifying relevant content. More specifically, each piece of base content in a test set might be analyzed by one or more readers in a test group to determine whether the pieces of base content are offensive or non-offensive. Moreover, the units that might be extracted from these pieces of base content for relevant content identification might be counted. If the ratio of the total number of units that are associated with offensive pieces of base content, and the total number of units that are associated with non-offensive pieces of base content is below a threshold, the category may be a non-offensive category, and might be assigned the offensiveness score −1. Alternatively, if the ratio is less than or equal to the threshold, the category may be determined to be a non-offensive category, and might be assigned the offensiveness score +1. For example, fifty pieces of base content from the category travel and transportation might be reviewed by the test group. The test group might determine that ten of the pieces of base content are offensive and forty pieces of base content are not offensive. The offensive pieces of base content might include 128 units that might be extracted for identifying relevant content. The non-offensive pieces of base content might include 370 units that might be extracted for identifying relevant content. The ratio of these number of units 370/128 might be less than the threshold (e.g., 3.5) and the category travel and transportation might be determined to be an offensive category. As the category travel and transportation might be determined to be an offensive category, the category may be assigned the offensiveness score +1. And each of the units associated with the category travel and transportation might be assigned the same offensiveness score of +1. For example, the units hotel, rental car, foreign travel, train travel, map, etc. might each be assigned the offensiveness score +1. Alternatively, for the category books (which might be a non-offensive catagory), the units associated with this category, for example, hardbound, softbound, fiction, novels, etc. might be assigned the offensiveness score −1. While the foregoing describes the determination of category offensiveness based on the ratio described, the determination of offensiveness or non-offensiveness might be determined by a number of other methods, such as statistical distribution analysis or the like.

Subsequent to determining the sensitivity of a piece of base content and assigning offensiveness score to units, content-censor module 1100 is configured to determine, based on a number criteria, the units that might be used for relevant content identification. According to a first alternative, if a piece of base content is determined by the context-censor module to be non-sensitive based on the offensive units in the piece of base content (described above in detail), then any of the units (e.g., non-offensive units, offensive units, and neutral units) extracted from the piece of base content by unit-extraction module 232 might be used to identify relevant content. For example, unit-ranking module 245 might select a highest ranking unit for use by unit-matching module 325 for relevant content identification. According to a second alternative, if a piece of base content is determined by the context-censor module to be a sensitive piece of base content, then non-offensive units (i.e., units having offensiveness scores of −1) extracted from the base content might be ranked by the unit-ranking module and used for relevant content identification. According to a third alternative, if a piece of base content is determined by the context-censor module to be a sensitive piece of base content, the non-offensive units extracted from the base content might be used for relevant content identification, if i) an advertiser or sponsor has agreed to have their ads and or sponsor links served with the sensitive base content, or ii) a user agrees to receive relevant content served with ads, such that the combination is offensive. According to a fourth alternative, if a piece of base content is determined by the context-censor module to be a sensitive piece of base content, no relevant content might be served with the piece of base content, for example, if the units extracted from the base content are determined to be highly offensive. Units extracted from a piece of base content might be determined to be highly offensive if i) the total number of offensive units exceeds a threshold number, ii) the number of offensive units exceeds the number of non-offensive units, or iii) the ratio of the number of offensive units and the number of non-offensive units exceeds a threshold, or the like. According to the forth alternative, if a piece of base content is determined to be sensitive, an offensive unit might be chosen for relevant content identification. For example, a news article about bird flu might be served with advertisements for bird flue vaccines, wherein an offensive unit extracted from the new article might be bird flu, influenza or the like. Table 2 shown below summarizes the four alternatives described above.

TABLE 2

| Base Content Classification | Units used for Identification of Relevant Content by Unit-Matching Module | Return Code for Program Use | Serve Relevant Content (e.g., Ads, Sponsor Links, etc.) |
|---|---|---|---|
| Non-sensitive | Offensive Units, Non-Offensive Units, Neutral Units | 0 | Yes |
| Sensitive | Non-Offensive Units | 1 | Yes |
| Sensitive | Non-Offensive Units | 2 | advertiser, sponsor, and/or user dependent |
| Sensitive | Alternative 1) No Units Alternative 2) Offensive Units | 3 | Alternative 1) No Alternative 2) Yes if Offensive Units are Available |

Figure 12:
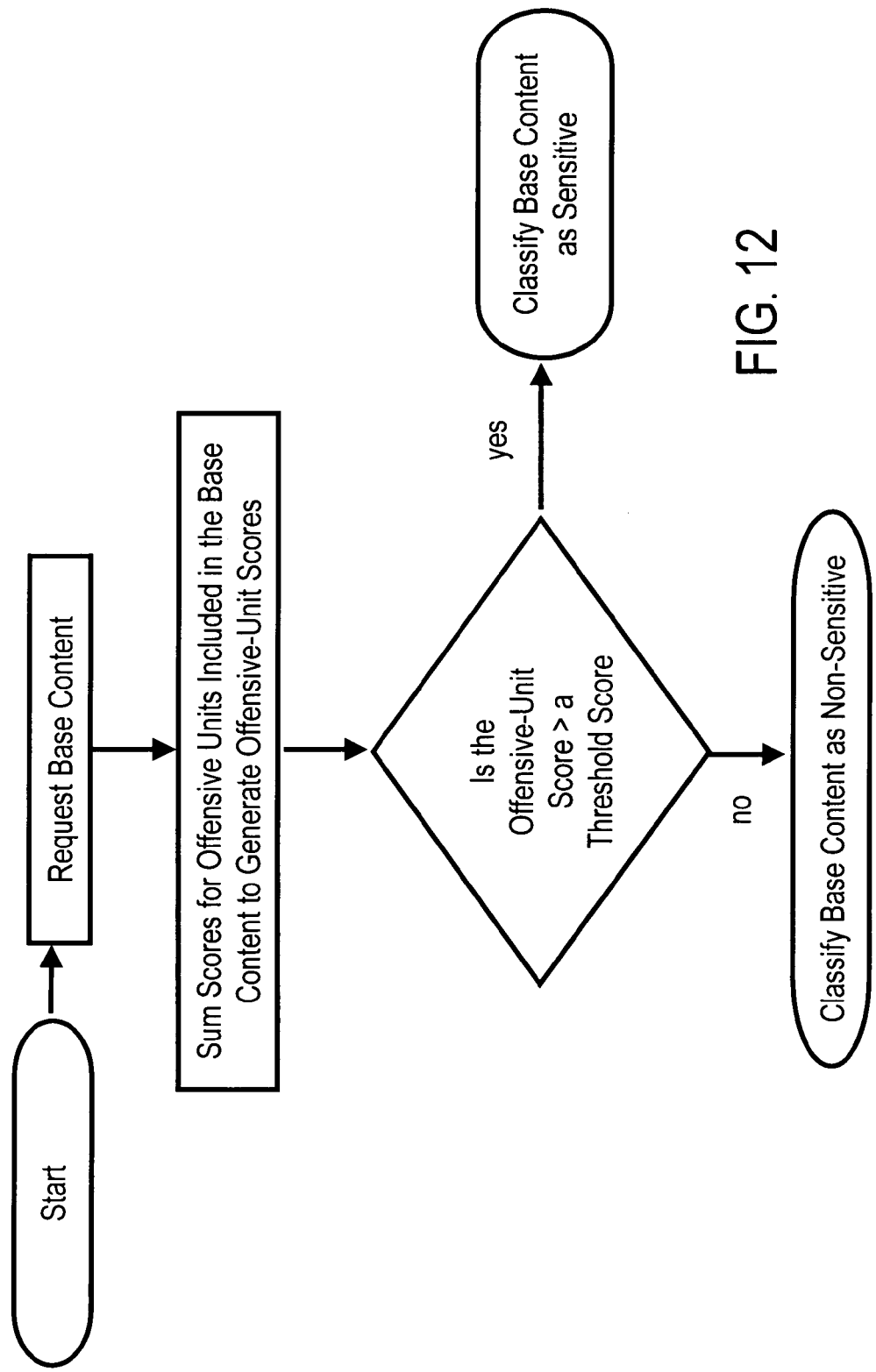
FIG. 12 is a high-level flow chart having steps for identifying a piece of base content as sensitive or non-sensitive.

FIG. 12 is a high-level flow chart having steps for identifying a piece of base content as sensitive or non-sensitive. The high-level flowchart is merely illustrative of an embodiment incorporating the present invention and does not limit the scope of the invention as recited in the claims. One of ordinary skill in the art would recognize variations, modifications, and alternatives. At 1200, a user requests a piece of base content. At 1205, scores for the offensive units included in the piece of base content are summed to generate an offensive-unit score for the piece of base content. If the offensive-unit score is above a threshold score the piece of base is classified as sensitive, step 1210. If the offensive-unit score is equal to or less than the threshold score, the piece of base content is classified as non-sensitive.

Figure 13:
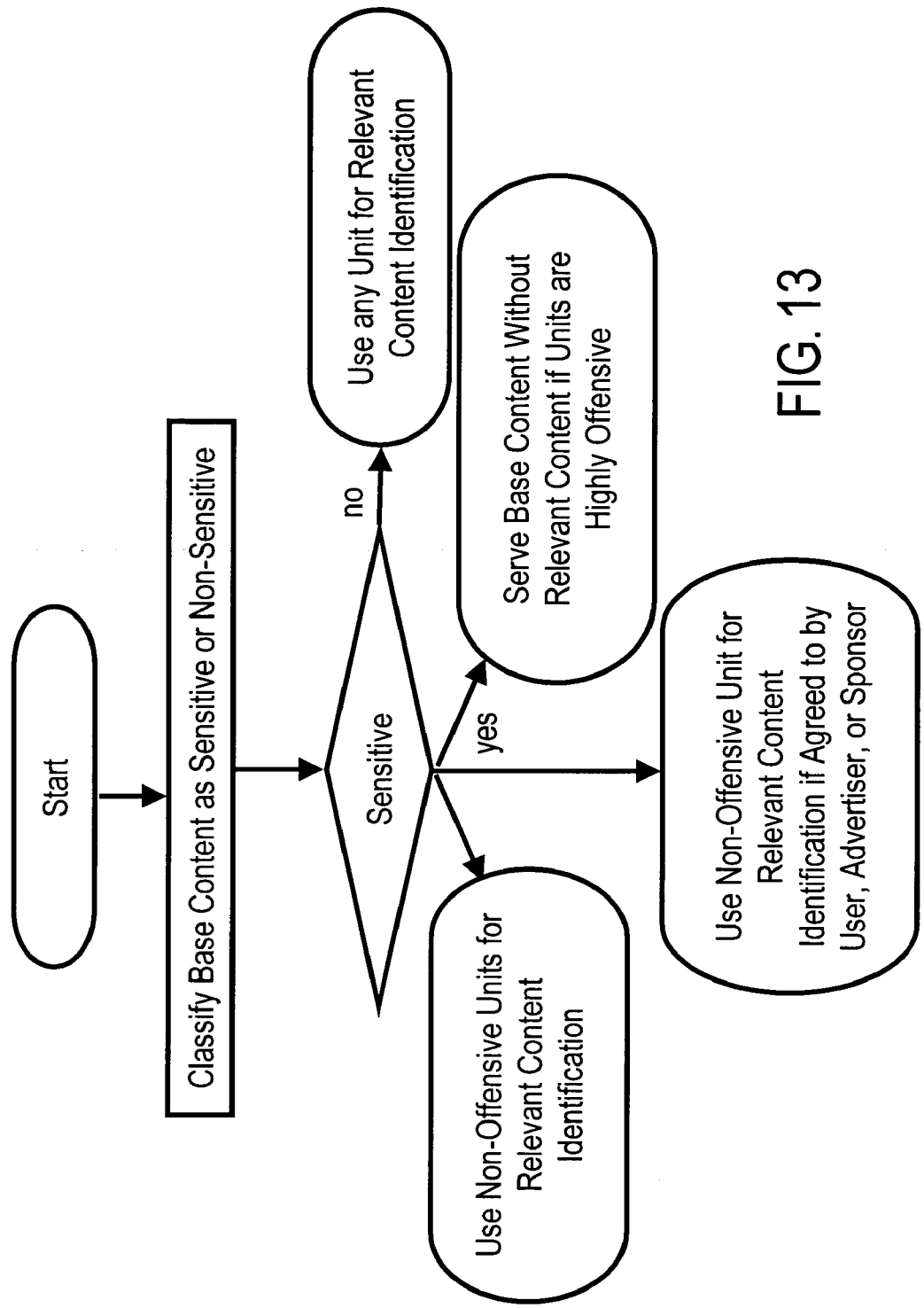
FIG. 13 is a high-level flow chart having steps for determining which of the units extracted from a piece of base content might be used for identification of relevant content for serving with the piece of base content.

FIG. 13 is a high-level flow chart having steps for determining which of the units extracted from a piece of base content might be used for identification of relevant content for serving with the piece of base content. The high-level flowchart is merely illustrative of an embodiment incorporating the present invention and does not limit the scope of the invention as recited in the claims. One of ordinary skill in the art would recognize variations, modifications, and alternatives. At 1300, a piece of base content is classified as sensitive or non-sensitive as described above with respect to the high-level flow chart shown in FIG. 12. If the requested piece of base content is non-sensitive, then use any unit (e.g., a highest ranking unit) extracted from the base content might be used for relevant content identification, step 1305. If the requested piece of base content is sensitive and the base content includes non-offensive units, then one or more of the non-offensive units are used for relevant content identification, step 1310. For example, a highest ranking non-offensive unit might be used for relevant content identification. If the requested piece of base content does not include non-offensive units, one or more of the offensive units extracted from the base content are used for relevant content identification, if, for example, an advertiser, user, sponsor or the like agrees to serve ads or links with base content, such that the ads, links, and base content might be offensive, step 1315. If the requested piece of base content is sensitive, and the units extracted from the base content are highly offensive, then do not serve relevant content with the base content, step 1320.

Figure 14:
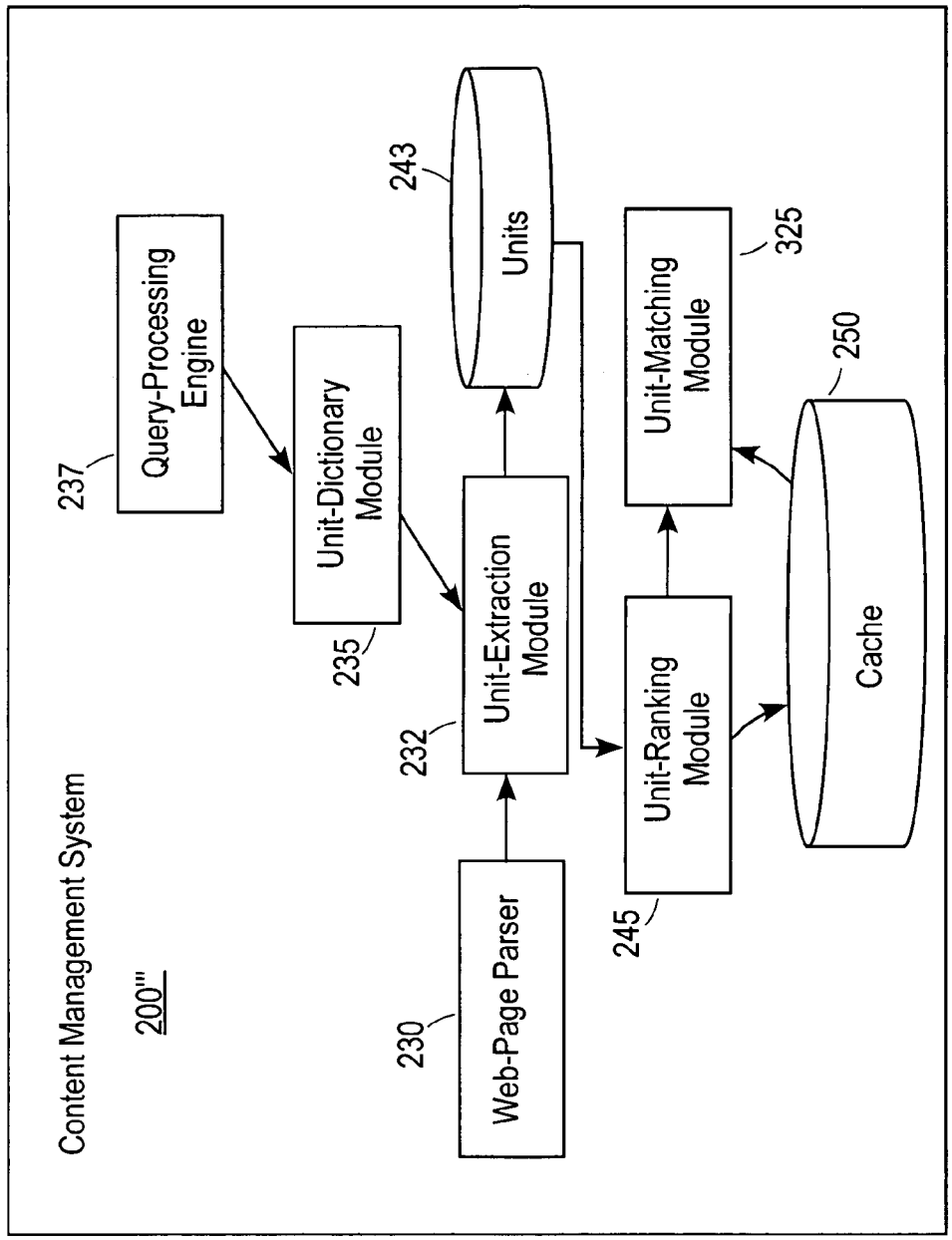
FIG. 14 is a simplified schematic of a content-management system according to another embodiment of the present invention.

It is to be understood that the examples and embodiments described above are for illustrative purposes only and that various modifications or changes in light thereof will be suggested to persons skilled in the art and are to be included within the spirit and purview of this application and scope of the appended claims. For example, while, embodiments of content-management systems described herein have been characterized as receiving a unit-dictionary module from a query-processing engine, according to some embodiments, the query-processing engine may be included in the content-management system; see for example content-management system 200''' in FIG. 14. According to other examples, content-management systems might include various modules described herein, such as a content-censor module and a related-unit module as well as other modules. According to another example, different units extracted from a piece of base content might be used to identify different relevant content, such as ads, sponsor links, inside links, and integrated links. Therefore, the above description should not be taken as limiting the scope of the invention as defined by the claims.

What is claimed is:

1. A system configured to associate base content with relevant content, the system comprising:
    A processor;
    a parsing module configured to parse the base content to form parsed base content;
    a unit-dictionary module coupled with the parsing module and including a plurality of query units;
    a query processing engine coupled with the unit-dictionary module and configured to receive and remove query units from the plurality of query units in the unit-dictionary module;
    a unit-extraction module coupled with the unit-dictionary module and configured to selectively extract at least one query unit of the plurality of query units from the parsed base content, wherein the parsed base content includes the extracted at least one query unit;
    a unit-ranking module coupled with the unit-extraction module and configured to rank the extracted query units based on a relevance score and a revenue-generation amount for the extracted query units to identify relevant content, wherein the relevance score is based at least partially on a location of the extracted query unit within the base content; and
    a unit-matching module coupled with the unit-ranking module and configured to generate at least one association between the base content and the relevant content based on a similarity between the extracted query units and a query unit associated with the relevant content, wherein the relevant content includes at least one advertisement.

2. The system of claim 1, further comprising, a memory configured to cache the at least one association.

3. The system of claim 2, wherein the unit-matching module is configured to form the at least one association in real time when a user requests base content that does not have associations cached in the memory.

4. The system of claim 3, further comprising control logic configured to cache at least one association formed in real time into the memory.

5. The system of claim 1, wherein the unit-matching module is configured to generate the at least one association between the base content and the relevant content based on whether the extracted-query units and at least one of the query units and keywords associated with the relevant content are the same or are in a same set of related query units and keywords.

6. The system of claim 1, wherein the relevant content and the base content are served to a user based on the at least one association, if the user requests the base content.

7. The system of claim 1, wherein the relevant content is pointed at by a set of links that are served with the base content.

8. The system of claim 7, wherein the set of links includes at least one of a sponsor link, an integrated link, an inside link, or combinations thereof.

9. The system of claim 7, wherein the set of links include uniform resource locators (URLs).

10. The system of claim 1, wherein the relevant content and the base content are served on a web page of a client browser.

11. The system of claim 1, wherein the system is configured to receive a uniform resource locator from a property server, and wherein the URL points at the base content on the property server.

12. The system of claim 2, wherein the parsing module is configured to retrieve the base content based on the URL.

13. The system of claim 1, further comprising a property sever configured to provide a configuration file to the parsing module, and wherein the configuration file includes a set of parsing rules for parsing base content.

14. The system of claim 13, wherein the configuration file includes weighting factors for the relevance scores and the revenue-generation amounts.

15. The system of claim 13, wherein the parsing rules provide for parsing at least one of a title, metadata keywords, a metadata description, anchor text, body text, proper nouns, formatted text, or combinations thereof.

16. The system of claim 15, wherein the formatted text includes bold text, italicized text, or combinations thereof.

17. The system of claim 15, wherein the parsing rules further provide for parsing text characterized as important text by an indication in the base content.

18. The system of claim 1, wherein the unit-ranking module is configured to calculate overall-relevance scores for the extracted-query units based on the revenue-generation amounts and the relevance scores.

19. The system of claim 18, wherein the unit-matching module is configured to compare an extracted-query unit having a highest overall-relevance score with at least one of the query units and the keywords of the relevant content.

20. The system of claim 18, wherein the unit-matching module is configured to compare the extracted-query units, having overall-relevance scores greater than or equal to a threshold score, with at least one of the query units and keywords of the relevant content.

21. The system of claim 18, wherein the overall-relevance scores are generated according to the formulas:

$$ORS = W*RGA + (1-W)*RS,$$

wherein ORS is an overall-relevance score, W is a weighting factor, RGA is a revenue-generation amount, and RS is a relevance score.

22. The system according the claim 21, wherein weighting factors are different for each property server configured to provide base content to the system.

23. A system configured to associate base content with relevant content and serve the base content with the relevant content to a user system, the system comprising:
    A processor;
    a plurality of property servers configured to provide the base content;
    a content-management system coupled with the plurality of property servers and configured to receive the base content from the property servers and generate at least one association between the base content and the relevant content, wherein the content-management system includes:
- a parsing module configured to parse the base content to form parsed base content;
- a unit-dictionary module coupled with the parsing module and including a plurality of query units;
- a query processing engine coupled with the unit-dictionary module and configured to receive and remove query units from the plurality of query units in the unit-dictionary module;
- a unit-extraction module coupled with the unit-dictionary module and configured to extract query units included in the unit-dictionary module from the parsed based content, wherein the query units extracted from the base content are referred to as the extracted-query units;
- a unit-ranking module coupled with the unit-extraction module and configured to rank the query units based on relevance scores and revenue-generation amounts for the query units, wherein the relevance scores of the query units reflects a number of times the query unit appears within the base content; and
- a unit-matching module coupled with the unit-ranking module and configured to generate at least one association between the base content and the relevant content based on whether the extracted-query units and the query units associated with the relevant content are the same; and
- a client browser coupled with the unit-matching module and configured to receive the base content and the relevant content and present the base content and relevant content as a published web page, wherein the relevant content includes at least one advertisement.

24. The system of claim 23, further comprising, a memory configured to cache the at least one association.

25. The system of claim 24, wherein the unit-matching module is configured to form the at least one association in real time if a user requests base content that does not have associations cached in the memory.

26. The system of claim 23, wherein the relevant content and the base content are served to a user based on the at least one association, if the user requests the base content.

27. The system of claim 23, wherein the relevant content is pointed at by a set of links that are served with the base content.

28. The system of claim 27, wherein the set of links includes at least one of a sponsor link, an integrated link, and an inside link.

29. The system of claim 23, wherein the property servers are configured to provide configuration files to the parsing module, and wherein the configuration files include a set of parsing rules for parsing base content.

30. The system of claim 29, wherein the parsing rules provide for parsing at least one of a title, metadata keywords, a metadata description, anchor text, body text, proper nouns, formatted text.

31. The system of claim 29, wherein the formatted text includes bold text and italicized text.

32. The system of claim 29, wherein the parsing rules further provide for parsing text characterized as important text by an indication in the base content.

33. The system of claim 23, wherein the unit-ranking module is configured to calculate overall-relevance scores for the extracted-query units based on the revenue-generation amounts and the relevance scores.

34. The system of claim 33, wherein the unit-matching module is configured to compare an extracted-query unit, having a highest overall-relevance score, with at least one the query units and the keywords of the relevant content.

35. The system of claim 33, wherein the unit-matching module is configured to compare the extracted-query units, having overall-relevance scores greater than or equal to a threshold score, with at least one of the query units and the keywords of the relevant content.

36. The system of claim 33, wherein the overall-relevance scores are generated according to the formula:

$$ORS = W*RGA + (1-W)*RS,$$

wherein ORS is an overall-relevance score, W is a weighting factor, RGA is a revenue-generation amount, and RS is a relevance score.

37. A method for serving base content and content that is relevant to the base content, the content being referred to as the relevant content, the method comprising:
- parsing the base content to form parsed base content;
- extracting a set of query units from the parsed base content based on query units in a unit-dictionary module, wherein the query units extracted from the base content are referred to as the extracted-query units;
- ranking the extracted-query units based on relevance scores and revenue-generation amounts for the query units extracted from the base content:
- comparing the extracted-query units with query units for the relevant content to determine matches between the extracted-query units and the query units for the relevant content;
- forming at least one association between the base content and the relevant content when at least one of the extracted-query units match at least one of the query units for the relevant content; and
- providing the base content with the relevant content based on the association, wherein the relevant content includes at least one advertisement comprising at least one of a sponsor link, an integrate link, or an inside link within the base content.

38. The method of claim 37, further comprising caching the association in a memory.

39. The method of claim 37, further comprising retrieving the association from memory to serve the base content with the relevant content if a user requests the base content.

40. The method of claim 37, further comprising serving the base content with the relevant content if the user requests the base content.

41. The method of claim 37, wherein the step of forming the association includes forming the association in real time if a user requests base content that does not have an association cached in a memory.

42. The method of claim 37, wherein the step of forming the association includes forming the association if the extracted-query units and the query units or the keywords associated the relevant content are the same or are in a same set of related query units and keywords.

43. The method of claim 37, wherein the relevant content is pointed at by a set of links that are served with the base content.

44. The method of claim 43, wherein the set of links includes at least one of a sponsor link, an integrated link, and an inside link.

45. The method of claim 37, wherein the ranking step includes calculating overall-relevance scores for the extracted-query units based on the revenue-generation amounts and the relevance scores.

46. The method of claim 45, wherein the comparing step includes comparing an extracted-query unit, having a highest overall-relevance score, with at least one of the query units and the keywords associated with the relevant content.

47. The method of claim 45, wherein the overall-relevance scores are generated according to the formula:

$$ORS = W*RGA + (1-W)*RS,$$

wherein ORS is an overall-relevance score, W is a weighting factor, RGA is a revenue-generation amount, and RS is a relevance score.

* * * * *

UNITED STATES PATENT AND TRADEMARK OFFICE
CERTIFICATE OF CORRECTION

PATENT NO. : 7,483,891 B2 Page 1 of 1
APPLICATION NO. : 10/829814
DATED : January 27, 2009
INVENTOR(S) : Hongche Liu et al.

It is certified that error appears in the above-identified patent and that said Letters Patent is hereby corrected as shown below:

<u>In the Claims</u>

In column 24, claim 11, line 15, after "resource locator" insert --(URL)--.

In column 26, claim 34, line 3, after "with at least one" insert --of--.

In column 26, claim 42, around line 56, before "the relevant content" insert --with--.

Signed and Sealed this

Seventh Day of July, 2009

JOHN DOLL
*Acting Director of the United States Patent and Trademark Office*